US012609960B2

(12) United States Patent
Ahmad et al.

(10) Patent No.: US 12,609,960 B2
(45) Date of Patent: Apr. 21, 2026

(54) ENTITY MALICIOUSNESS ANALYSIS USING AUTONOMOUS ARTIFICIAL INTELLIGENCE AGENTS

(71) Applicant: Microsoft Technology Licensing, LLC, Redmond, WA (US)

(72) Inventors: Naveed Azeemi Ahmad, Medford, MA (US); Lloyd Geoffrey Greenwald, Murray Hill, NJ (US); Muhammed Fatih Bulut, Cambridge, MA (US); Yingqi Liu, San Jose, CA (US); Acar Tamersoy, Culver City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/759,745

(22) Filed: Jun. 28, 2024

(65) Prior Publication Data

US 2026/0006066 A1 Jan. 1, 2026

(51) Int. Cl.
H04L 9/40 (2022.01)
G06N 20/20 (2019.01)

(52) U.S. Cl.
CPC ......... H04L 63/1441 (2013.01); G06N 20/20 (2019.01); H04L 63/1416 (2013.01)

(58) Field of Classification Search
CPC .. H04L 63/1441; H04L 63/1416; G06N 20/20
USPC .......................................................... 726/23
See application file for complete search history.

(56) References Cited

U.S. PATENT DOCUMENTS

| | | | |
|---|---|---|---|
| 11,606,379 B1 | 3/2023 | Pratt | |
| 11,811,811 B1 | 11/2023 | Kjar | |
| 12,309,185 B1 * | 5/2025 | Skarphedinsson | .... H04L 67/535 |
| 2010/0192225 A1 * | 7/2010 | Ma | ....................... H04L 63/1416 |
| | | | 709/224 |
| 2019/0182273 A1 | 6/2019 | Walsh | |

(Continued)

FOREIGN PATENT DOCUMENTS

EP           3926501 B1       8/2023

OTHER PUBLICATIONS

Co-pending U.S. Appl. No. 18/429,304 entitled "Methods and Systems for Efficiently Detecting and Recording Security Anomalies", filed on Jan. 31, 2024, 37 pages.

(Continued)

*Primary Examiner* — Teshome Hailu
(74) *Attorney, Agent, or Firm* — Wade IP Law PLLC

(57) ABSTRACT

Techniques are described herein that are capable of performing entity maliciousness analysis using autonomous AI agents. A first autonomous AI agent selects relevant data from a corpus of data using a first selected AI tool in an AI model as a result of the relevant data being associated with an entity. A second autonomous AI agent generates a maliciousness determination, which indicates whether the entity exhibits malicious behavior, by analyzing the relevant data using a second selected AI tool in the AI model. A third autonomous AI agent generates a validity determination, which indicates whether the maliciousness determination is valid, by analyzing the maliciousness determination using a third selected AI tool in the AI model. As a result of an analysis that takes into consideration the validity determination, execution of an instruction that causes a security action to be performed with regard to the entity is triggered.

21 Claims, 8 Drawing Sheets

(56) References Cited

U.S. PATENT DOCUMENTS

| | | | |
|---|---|---|---|
| 2021/0174253 A1 | 6/2021 | Moore | |
| 2022/0187847 A1* | 6/2022 | Cella | G06Q 10/0833 |
| 2022/0197306 A1* | 6/2022 | Cella | B33Y 50/02 |
| 2023/0164150 A1 | 5/2023 | Abrahamian | |
| 2023/0222454 A1* | 7/2023 | Cella | G06Q 10/06315 |
| | | | 705/28 |
| 2024/0054233 A1* | 2/2024 | Ohayon | G06F 21/577 |
| 2024/0089275 A1 | 3/2024 | An | |
| 2024/0291853 A1* | 8/2024 | Murphy | H04L 41/16 |
| 2024/0333743 A1 | 10/2024 | Bazalgette | |
| 2025/0103966 A1 | 3/2025 | Beauchesne | |
| 2025/0322216 A1 | 10/2025 | Avi | |
| 2025/0350628 A1 | 11/2025 | Murphy | |
| 2025/0392607 A1 | 12/2025 | Urmanov | |
| 2026/0006047 A1 | 1/2026 | Ahmad et al. | |
| 2026/0006053 A1 | 1/2026 | Ahmad et al. | |

OTHER PUBLICATIONS

Extended European search report received in European Application No. 25184021.1, mailed on Oct. 8, 2025, 9 pages.
Extended European search report received for EP Application No. 25184274.6, mailed on Oct. 16, 2025, 11 Pages.
Extended European search report received in European Application No. 25185167.1, mailed on Oct. 24, 2025, 07 pages.
Non-Final Office Action mailed on Dec. 16, 2025, in U.S. Appl. No. 18/755,032, 33 pages.
Non-Final Office Action mailed on Feb. 25, 2026, in U.S. Appl. No. 18/759,729, 41 pages.

* cited by examiner

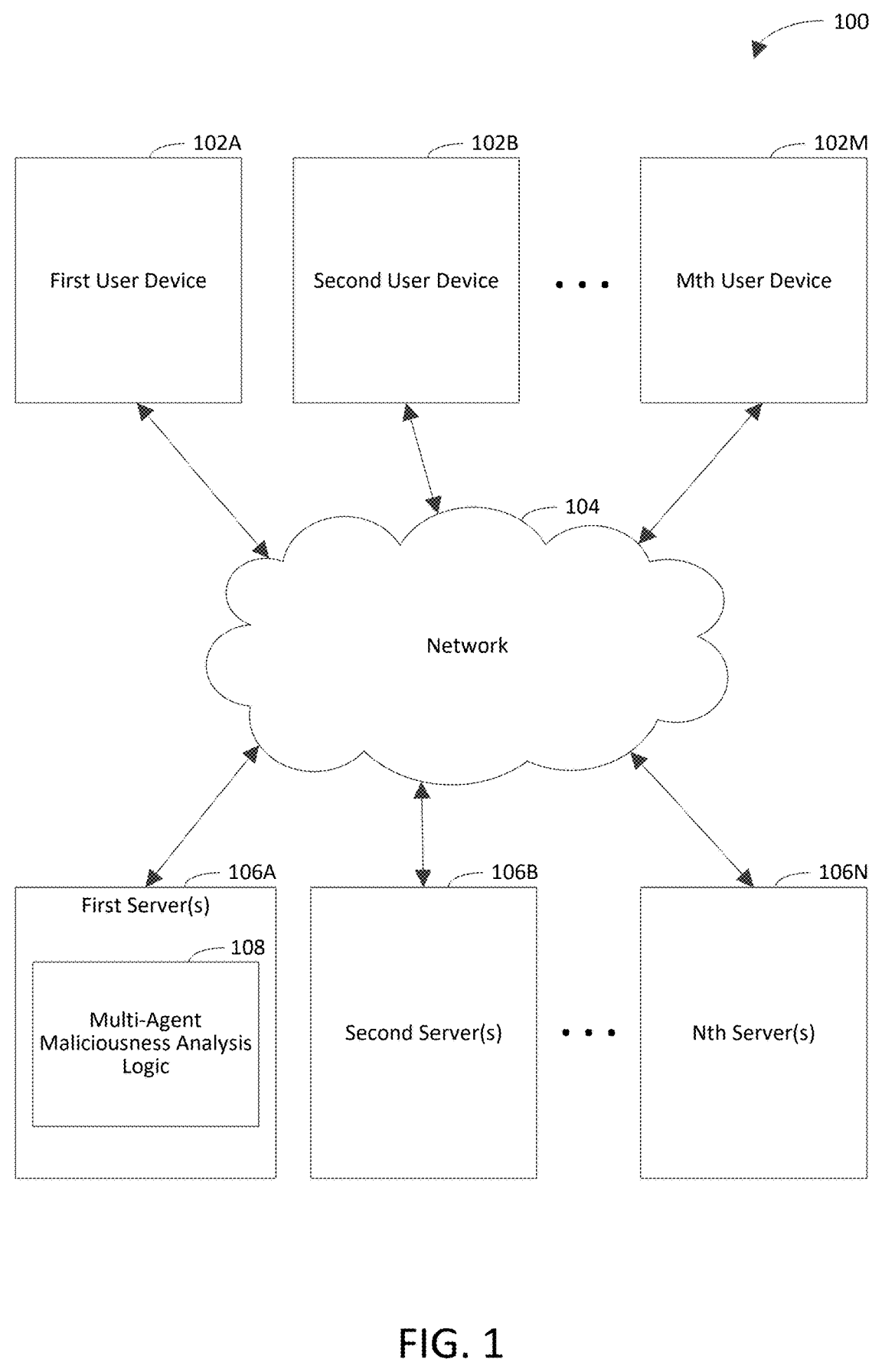

100

102A

102B

102M

First User Device

Second User Device

• • •

Mth User Device

104

Network

106A

First Server(s)

108

Multi-Agent
Maliciousness Analysis
Logic

106B

Second Server(s)

• • •

106N

Nth Server(s)

FIG. 1

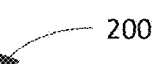

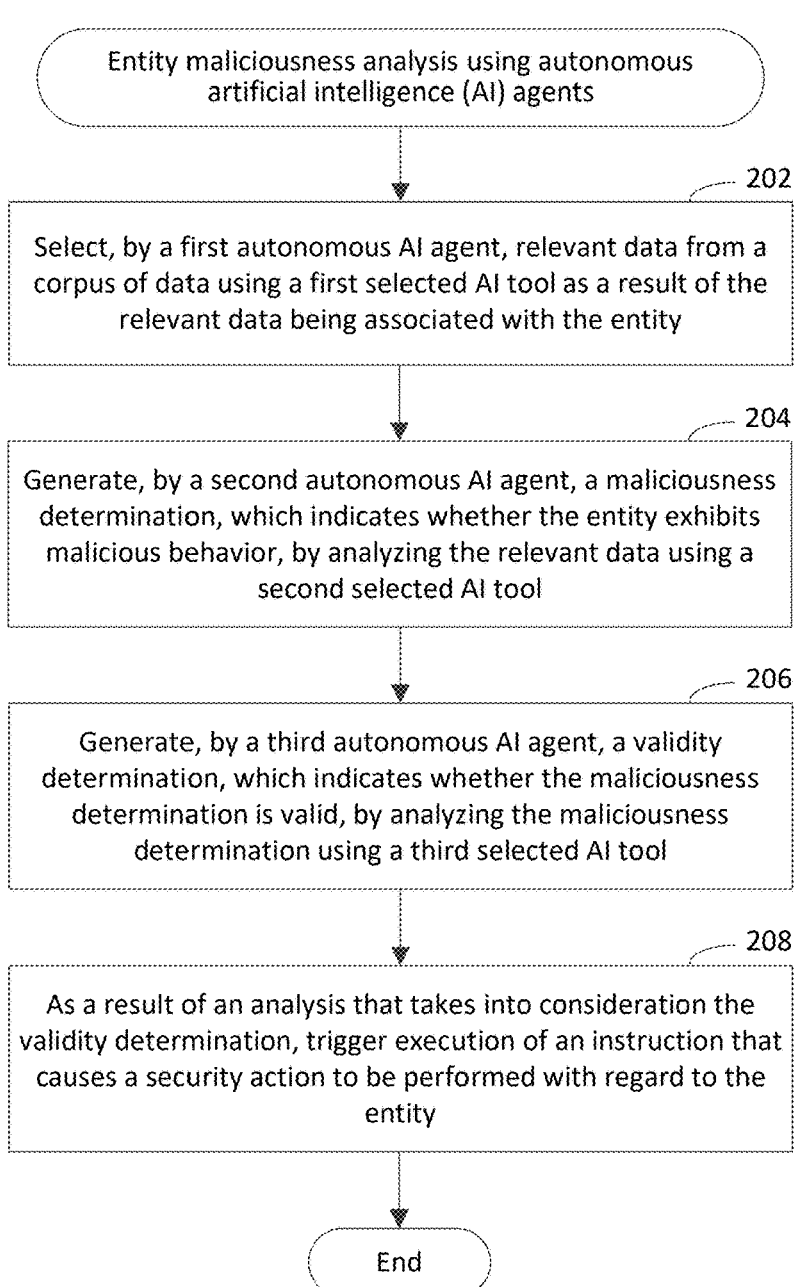

Entity maliciousness analysis using autonomous artificial intelligence (AI) agents

202

Select, by a first autonomous AI agent, relevant data from a corpus of data using a first selected AI tool as a result of the relevant data being associated with the entity

204

Generate, by a second autonomous AI agent, a maliciousness determination, which indicates whether the entity exhibits malicious behavior, by analyzing the relevant data using a second selected AI tool

206

Generate, by a third autonomous AI agent, a validity determination, which indicates whether the maliciousness determination is valid, by analyzing the maliciousness determination using a third selected AI tool

208

As a result of an analysis that takes into consideration the validity determination, trigger execution of an instruction that causes a security action to be performed with regard to the entity End

FIG. 2

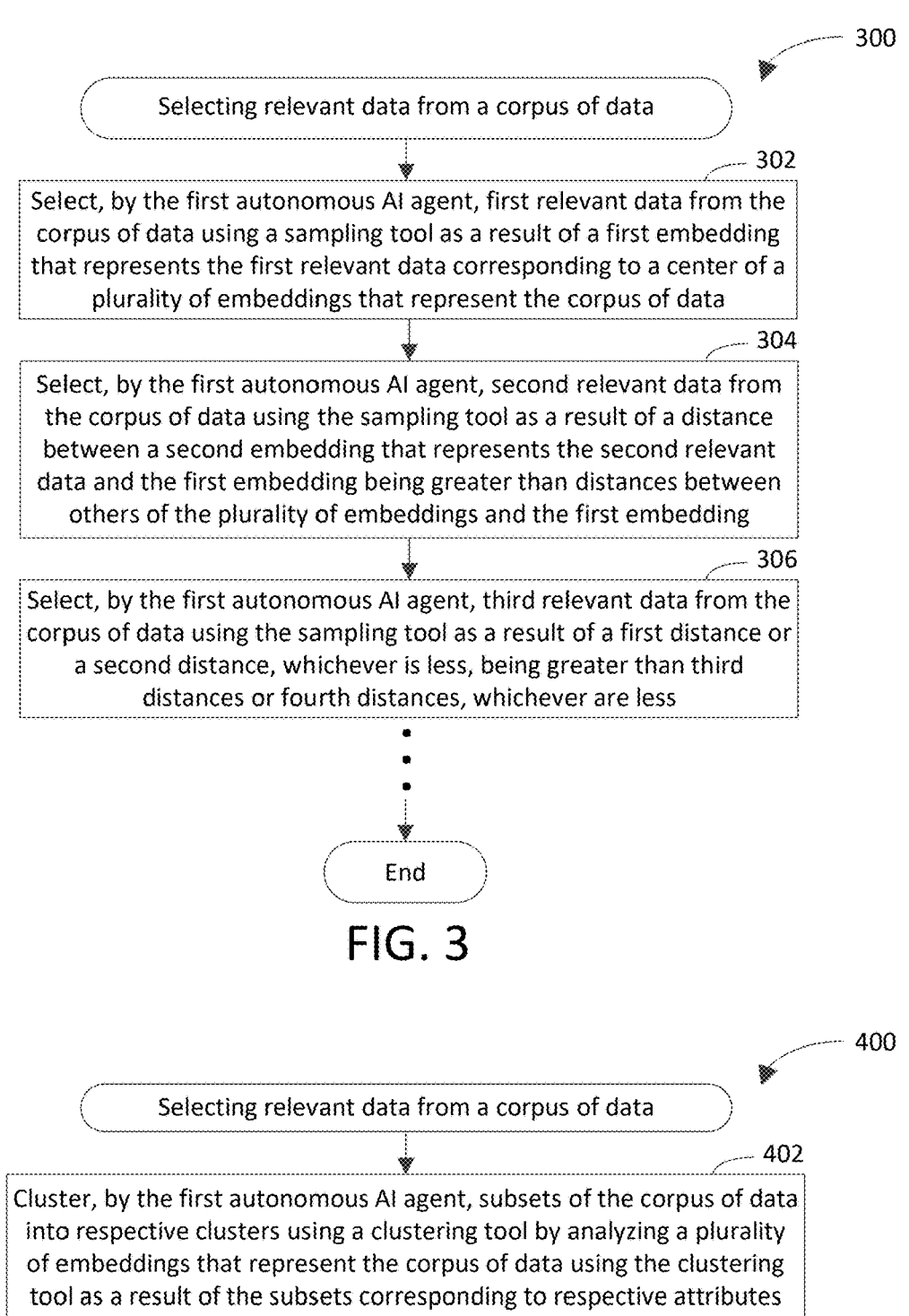

300

Selecting relevant data from a corpus of data

302

Select, by the first autonomous AI agent, first relevant data from the corpus of data using a sampling tool as a result of a first embedding that represents the first relevant data corresponding to a center of a plurality of embeddings that represent the corpus of data

304

Select, by the first autonomous AI agent, second relevant data from the corpus of data using the sampling tool as a result of a distance between a second embedding that represents the second relevant data and the first embedding being greater than distances between others of the plurality of embeddings and the first embedding

306

Select, by the first autonomous AI agent, third relevant data from the corpus of data using the sampling tool as a result of a first distance or a second distance, whichever is less, being greater than third distances or fourth distances, whichever are less End

Selecting relevant data from a corpus of data

402

Cluster, by the first autonomous AI agent, subsets of the corpus of data into respective clusters using a clustering tool by analyzing a plurality of embeddings that represent the corpus of data using the clustering tool as a result of the subsets corresponding to respective attributes

404

Select, by the first autonomous AI agent, the relevant data from the respective clusters using the first selected AI tool End

FIG. 4

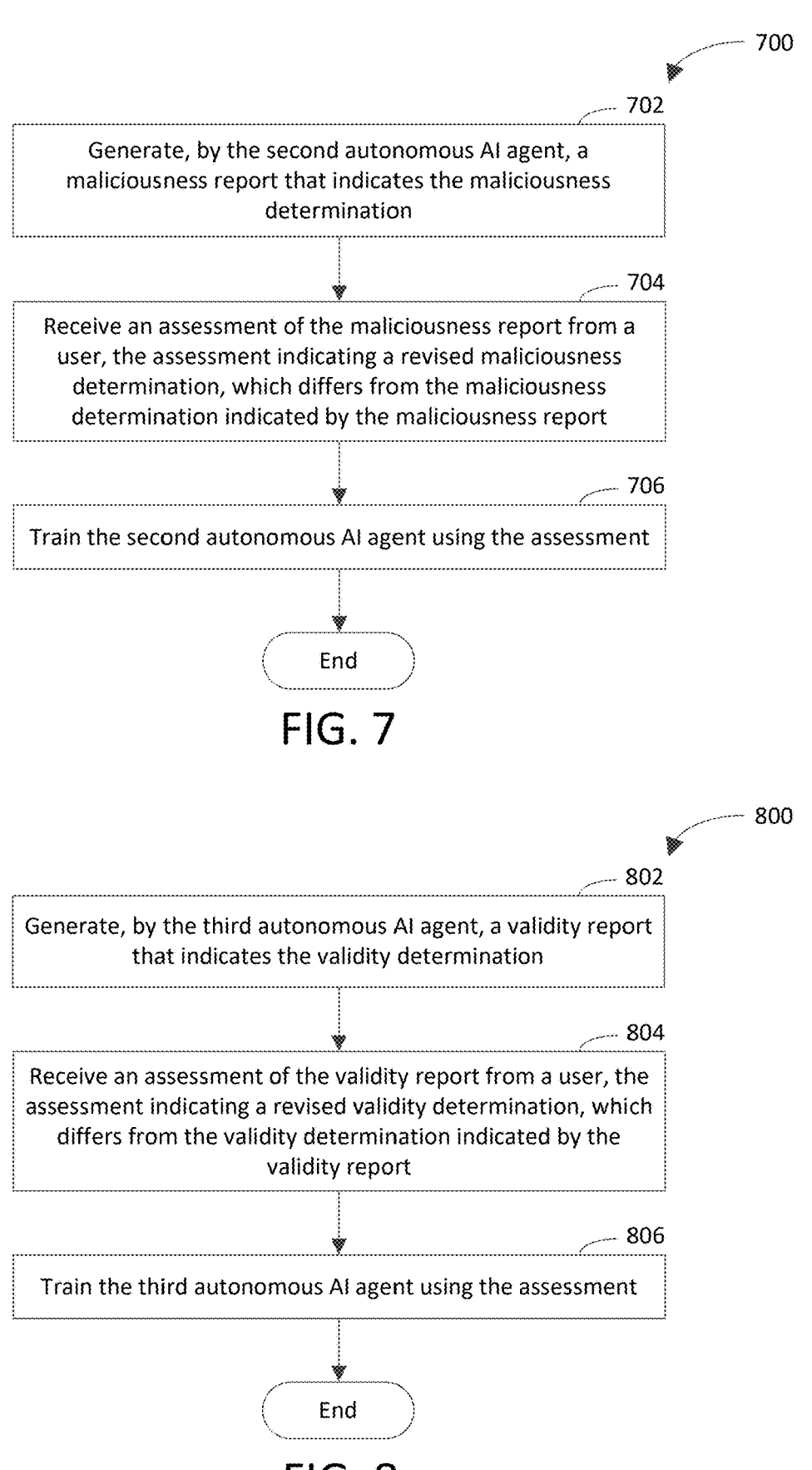

700

702

Generate, by the second autonomous AI agent, a maliciousness report that indicates the maliciousness determination

704

Receive an assessment of the maliciousness report from a user, the assessment indicating a revised maliciousness determination, which differs from the maliciousness determination indicated by the maliciousness report

706

Train the second autonomous AI agent using the assessment

End

Generate, by the third autonomous AI agent, a validity report that indicates the validity determination

804

Receive an assessment of the validity report from a user, the assessment indicating a revised validity determination, which differs from the validity determination indicated by the validity report

806

Train the third autonomous AI agent using the assessment

End

FIG. 8

ENTITY MALICIOUSNESS ANALYSIS USING AUTONOMOUS ARTIFICIAL INTELLIGENCE AGENTS

BACKGROUND

Cybersecurity includes measures that are taken to protect a system (e.g., a computer or a network) from cyberattacks (a.k.a. attacks, digital attacks, or malicious attacks). One common challenge that such measures seek to address is detection of malicious activities with regard to the system. Conventional techniques for detecting malicious activities sometimes result in a substantial number of false positives. A false positive is an incorrect determination that a non-malicious activity is malicious. It may be desirable to reduce the number of false positives that are produced by the conventional techniques. For instance, reducing the number of false positives may enable security teams to concentrate on the most crucial matters (e.g., activities that are indeed malicious). By concentrating on the most crucial matters, the security of the system may be increased.

SUMMARY

Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

It may be desirable to use autonomous AI agents to detect malicious behavior of an entity. An autonomous AI agent is a computer program (e.g., a standalone computer program) that is configured to select one or more AI tools of an AI model (e.g., in real-time) based on one or more factors to achieve a purpose for which the autonomous AI agent is configured. For instance, the autonomous AI agent may select first AI tool(s) of the AI model based on existence of first factor(s). The autonomous AI agent may select second AI tool(s) of the AI model based on existence of second factor(s), and so on. The autonomous AI agent may use multiple AI tools simultaneously to obtain respective results, and the autonomous AI agent may select the most common result among those results to serve as an output of the autonomous AI agent. A process of detecting the malicious behavior may include multiple steps, and each autonomous AI agent may be configured to perform a respective step of the process. For instance, the purpose of each autonomous AI agent may be to perform the respective step of the process. By focusing on a particular step, an autonomous AI agent may be capable of performing the particular step more accurately, precisely, and/or reliably than a more generic computer program that is configured to perform more (e.g., all) of the steps. The autonomous AI agents achieving their respective purposes more accurately, precisely, and/or reliably than a more generic computer program would be capable of doing so may result in fewer false positives. By "autonomous," it is meant that each autonomous AI agent is capable of operating in absence of the other autonomous agents. Nevertheless, output of any one or more autonomous AI agents may be used as input to any one or more other autonomous AI agents.

An AI tool of an AI model is functionality of the AI model that is configured to perform a particular type of operation. Each AI tool may include its own AI model, though the example embodiments are not limited in this respect. Examples of a particular type of operation include but are not limited to random forest learning, isolation forest anomaly detection, naïve Bayes classification, K-nearest neighbors classification, K-nearest neighbors regression, gradient boosting, support vector machine (SVM) classification, linear regression, nonlinear regression, Poisson regression, quantile regression, nonparametric regression, stratified random sampling, cluster random sampling, systematic random sampling, frequency analysis, and P-value analysis.

Any one or more types of operation may be configured to process a particular type of data. Examples of a type of data include but are not limited to a log (e.g., a role log), a web page, an intelligence report, information regarding a particular attack, and information regarding a particular type of attack. Any one or more types of operation may be configured to operate on data without regard to a type of the data. A log indicates events that occur with regard to one or more entities. For instance, the log may pertain to a particular period of time. An intelligence report indicates method(s) used by threat actor(s) to perform malicious activities. A threat actor is an entity (e.g., a person, a group of people, or a system (e.g., an autonomous agent)) that intentionally causes (or tries to cause or is configured to cause) harm to a system. For instance, the threat actor may exploit a vulnerability of the system to perpetuate a cyberattack. Examples of a cyberattack include but are not limited to a denial of service (DOS) attack, a distributed DoS (DDOS) attack, a man-in-the-middle (MITM) attack, a malware attack, a phishing attack, a ransomware attack, and a cross-site scripting (XSS) attack.

The intelligence report may indicate (e.g., specify or describe) one or more attributes of a threat actor. Examples of an attribute of a threat actor include but are not limited to a type of attack that the threat actor is known to have performed (e.g., commonly performs); a motivation of the threat actor; known targets of the threat actor; tactics, techniques, and procedures (TTPs) that have been utilized (e.g., are commonly utilized) by the threat actor; groups with which the threat actor is associated; TTPs, motivations, and targets of those groups; and types of attacks performed by those groups. Motivations of threat actors may be defined by respective threat actor types. Examples of a threat actor type include but are not limited to a cybercriminal, a nation-state actor, a hacktivist, a cyberterrorist, a corporate insider, or a thrill seeker.

TTPs of a threat actor (e.g., the threat actor) may include strategic plans, methodologies, and actions that the threat actor uses to develop and conduct a cyberattack. The relationship between tactics, techniques, and procedures is hierarchical. For instance, the tactics are used to select the techniques, and the techniques are used to inform the development of procedures. A tactic is a plan that indicates what is going to happen and why it is going to happen. A technique is a particular method to execute a tactic. A procedure is an action plan that describes steps that are to be performed to execute a particular technique. The MITRE Corporation has published an Adversarial Tactics, Techniques, and Common Knowledge (ATT&CK) framework, which details a variety of TTPs associated with threat actor groups.

Various approaches are described herein for, among other things, performing entity maliciousness analysis using autonomous AI agents. In an example approach, a first autonomous artificial intelligence (AI) agent selects relevant data from a corpus of data using a first selected AI tool as a result of the relevant data being associated with an entity. The first selected AI tool is selected by the first autonomous AI agent from a plurality of first AI tools in an AI model that are available to the first autonomous AI agent. A second autonomous AI agent generates a maliciousness determination, which indicates whether the entity exhibits malicious behavior, by analyzing the relevant data using a second selected AI tool. The second selected AI tool is selected by the second autonomous AI agent from a plurality of second AI tools in the AI model that are available to the second autonomous AI agent. A third autonomous AI agent generates a validity determination, which indicates whether the maliciousness determination is valid, by analyzing the maliciousness determination using a third selected AI tool. The third selected AI tool is selected by the third autonomous AI agent from a plurality of third AI tools in the AI model that are available to the third autonomous AI agent. As a result of an analysis that takes into consideration the validity determination, execution of an instruction that causes a security action to be performed with regard to the entity is triggered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example multi-agent maliciousness analysis system in accordance with an embodiment.

FIGS. 2 and 5-8 depict flowcharts of example methods for performing entity maliciousness analysis using autonomous AI agents in accordance with embodiments.

FIGS. 3-4 depict flowcharts of example methods for selecting relevant data from a corpus of data in accordance with embodiments.

Figure 5:
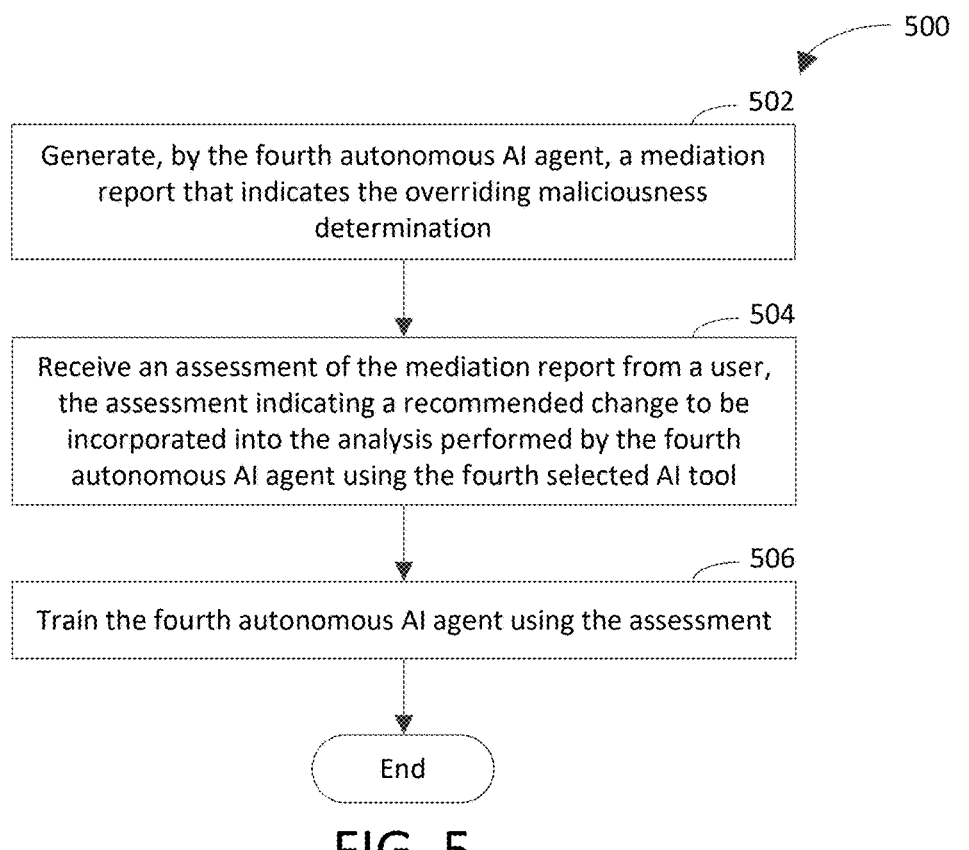

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

It may be desirable to use autonomous AI agents to detect malicious behavior of an entity. An autonomous AI agent is a computer program (e.g., a standalone computer program) that is configured to select one or more AI tools of an AI model (e.g., in real-time) based on one or more factors to achieve a purpose for which the autonomous AI agent is configured. For instance, the autonomous AI agent may select first AI tool(s) of the AI model based on existence of first factor(s). The autonomous AI agent may select second AI tool(s) of the AI model based on existence of second factor(s), and so on. The autonomous AI agent may use multiple AI tools simultaneously to obtain respective results, and the autonomous AI agent may select the most common result among those results to serve as an output of the autonomous AI agent. A process of detecting the malicious behavior may include multiple steps, and each autonomous AI agent may be configured to perform a respective step of the process. For instance, the purpose of each autonomous AI agent may be to perform the respective step of the process. By focusing on a particular step, an autonomous AI agent may be capable of performing the particular step more accurately, precisely, and/or reliably than a more generic computer program that is configured to perform more (e.g., all) of the steps. The autonomous AI agents achieving their respective purposes more accurately, precisely, and/or reliably than a more generic computer program would be capable of doing so may result in fewer false positives. By "autonomous," it is meant that each autonomous AI agent is capable of operating in absence of the other autonomous agents. Nevertheless, output of any one or more autonomous AI agents may be used as input to any one or more other autonomous AI agents.

An AI tool of an AI model is functionality of the AI model that is configured to perform a particular type of operation. Each AI tool may include its own AI model, though the example embodiments are not limited in this respect. Examples of a particular type of operation include but are not limited to random forest learning, isolation forest anomaly detection, naïve Bayes classification, K-nearest neighbors classification, K-nearest neighbors regression, gradient boosting, support vector machine (SVM) classification, linear regression, nonlinear regression, Poisson regression, quantile regression, nonparametric regression, stratified random sampling, cluster random sampling, systematic random sampling, frequency analysis, and P-value analysis.

Random forest learning is a supervised ensemble learning technique that uses multiple decision trees to determine likelihoods of outcomes (e.g., to make predictions). The random forest learning technique includes building the multiple decision trees (a.k.a. a forest of decision trees), training each decision tree on a respective random subset of data, and aggregating outputs (e.g., predictions) of the respective decision trees to provide an output of the random forest learning technique.

Isolation forest anomaly detection is an unsupervised anomaly detection technique that is configured to identify outliers (a.k.a. anomalies) in a dataset. The isolation forest anomaly detection technique isolates observations by randomly selecting a feature and randomly selecting a split value in a range of the feature. A relatively shorter path indicates an anomaly.

Naïve Bayes classification is a supervised classification technique that determines (e.g., predicts) a probability of an instance belonging to a class based on specified feature values. The naïve Bayes classification technique assumes that features having the specified feature values are conditionally independent for the class.

K-nearest neighbors classification classifies an unlabeled data point to the class that is most common among its K nearest neighbors. K is a positive integer.

K-nearest neighbors regression estimates (e.g., predicts) an average value of a property based on values of its K nearest neighbors.

Gradient boosting is an ensemble learning technique that combines multiple weak learners (e.g., decision trees) to create a stronger model. The gradient boosting technique starts with an initial value (e.g., a mean of a target variable), and subsequent models are trained to minimize residual errors (i.e., differences between actual and estimated (e.g., predicted) values. Gradient boosting can be used for classification and regression.

SVM classification is a supervised classification technique that is configured to identify the largest gap between data points of different classes.

Linear regression estimates a linear relationship between a dependent variable and one or more independent variables. The linear regression technique is configured to identify the best-fitting line that represents a general trend of a dataset.

Nonlinear regression fits data to a mathematical function that does not follow a straight line.

Poisson regression analyzes count data by modeling a log-linear relationship between predictors (i.e., features) and expected counts. The Poisson regression technique assumes that a response variable Y has a Poisson distribution and that a logarithm of an expected value of Y can be modeled by a linear combination of unknown parameters.

Quantile regression estimates conditional quantiles (e.g., median, quartiles) of a response variable.

Nonparametric regression is a regression technique in which a predictor (i.e., feature) does not assume a predefined form. Rather, the nonparametric regression technique constructs a relationship between predictors and a dependent variable based on data information.

Stratified random sampling is a sampling technique in which a dataset is divided into homogeneous subsets based on respective attributes. Each data point of the dataset is included in a single homogeneous subset. A random sample is selected from each homogeneous subset using another sampling technique.

Cluster random sampling is a sampling technique in which a dataset is divided into clusters, and data points are randomly selected from the clusters to form a sample.

Systematic random sampling is a sampling technique in which data points are selected from a dataset at regular predefined intervals to form a sample.

Frequency analysis is a technique that determines a frequency with which a data point occurs in a dataset.

P-value analysis is a technique that determines a probability value (a.k.a. a p-value) indicating a likelihood that observed data could have occurred under the null hypothesis. The null hypothesis is that no relationship exists between variables of interest or no difference exists among groups. A relatively low p-value indicates that the observed data is inconsistent with the null hypothesis, which may indicate that another hypothesis may be better supported by the observed data. A relatively high p-value indicates that the observed data is consistent with the null hypothesis Any one or more types of operation may be configured to process a particular type of data. Examples of a type of data include but are not limited to a log (e.g., a role log), a web page, an intelligence report, information regarding a particular attack, and information regarding a particular type of attack. Any one or more types of operation may be configured to operate on data without regard to a type of the data. A log indicates events that occur with regard to one or more entities. For instance, the log may pertain to a particular period of time. An intelligence report indicates method(s) used by threat actor(s) to perform malicious activities. A threat actor is an entity (e.g., a person, a group of people, or a system (e.g., an autonomous agent)) that intentionally causes (or tries to cause or is configured to cause) harm to a system. For instance, the threat actor may exploit a vulnerability of the system to perpetuate a cyberattack. Examples of a cyberattack include but are not limited to a denial of service (DOS) attack, a distributed DoS (DDOS) attack, a man-in-the-middle (MITM) attack, a malware attack, a phishing attack, a ransomware attack, and a cross-site scripting (XSS) attack. A DOS attack is an attack that renders a system unable to respond to a legitimate service request by overwhelming resource(s) of the system. A DDOS attack is similar to a DOS attack but involves multiple (e.g., a vast array) malware-infected hosts that are controlled by the threat actor to cause resource exhaustion. An MITM attack is an attack that enables the threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

The intelligence report may indicate (e.g., specify or describe) one or more attributes of a threat actor. Examples of an attribute of a threat actor include but are not limited to a type of attack that the threat actor is known to have performed (e.g., commonly performs); a motivation of the threat actor; known targets of the threat actor; tactics, techniques, and procedures (TTPs) that have been utilized (e.g., are commonly utilized) by the threat actor; groups with which the threat actor is associated; TTPs, motivations, and targets of those groups; and types of attacks performed by those groups. Motivations of threat actors may be defined by respective threat actor types. Examples of a threat actor type include but are not limited to a cybercriminal, a nation-state actor, a hacktivist, a cyberterrorist, a corporate insider, or a thrill seeker. A cybercriminal is a threat actor who commits cybercrimes. A nation-state actor is a threat actor who is funded by a nation state or government to attack another government's critical infrastructure. A hacktivist is a threat actor who uses hacking techniques to promote a political or social agenda. A cyberterrorist is a threat actor who engages in politically or ideologically motivated attacks that threaten or result in violence. A corporate insider is a threat actor who innocently or maliciously engages in an attack against a corporation that employs the corporate insider (e.g., by installing malware on a corporate system, stealing data, or damaging data or an application of the corporation). A thrill seeker is a threat actor who engages in an attack for fun.

TTPs of a threat actor (e.g., the threat actor) may include strategic plans, methodologies, and actions that the threat actor uses to develop and conduct a cyberattack. The relationship between tactics, techniques, and procedures is hierarchical. For instance, the tactics are used to select the techniques, and the techniques are used to inform the development of procedures. A tactic is a plan that indicates what is going to happen and why it is going to happen. A technique is a particular method to execute a tactic. A procedure is an action plan that describes steps that are to be performed to execute a particular technique. The MITRE Corporation has published an Adversarial Tactics, Techniques, and Common Knowledge (ATT&CK) framework, which details a variety of TTPs associated with threat actor groups.

Example embodiments described herein are capable of performing entity maliciousness analysis using autonomous AI agents. In an example approach, a first autonomous artificial intelligence (AI) agent selects relevant data from a corpus of data using a first selected AI tool as a result of the relevant data being associated with an entity. The first selected AI tool is selected by the first autonomous AI agent from a plurality of first AI tools in an AI model that are available to the first autonomous AI agent. A second autonomous AI agent generates a maliciousness determination, which indicates whether the entity exhibits malicious behavior, by analyzing the relevant data using a second selected AI tool. The second selected AI tool is selected by the second autonomous AI agent from a plurality of second AI tools in the AI model that are available to the second autonomous AI agent. A third autonomous AI agent generates a validity determination, which indicates whether the maliciousness determination is valid, by analyzing the maliciousness determination using a third selected AI tool. The third selected AI tool is selected by the third autonomous AI agent from a plurality of third AI tools in the AI model that are available to the third autonomous AI agent. As a result of an analysis that takes into consideration the validity determination, execution of an instruction that causes a security action to be performed with regard to the entity is triggered (e.g., automatically triggered).

Example techniques described herein have a variety of benefits as compared to conventional techniques for detecting malicious behavior. For instance, the example techniques are capable of reducing a number of false positives in which non-malicious behavior is classified as being malicious and/or increasing a number of true positives in which a malicious behavior is classified as being malicious. By using autonomous AI agents to determine whether an entity exhibits malicious behavior, the example techniques may be capable of making the determination more accurately, precisely, and/or reliably than conventional techniques.

The example techniques may reduce an amount of time and/or resources (e.g., processor cycles, memory, network bandwidth) that is consumed to determine whether an entity exhibits malicious behavior. For instance, the example techniques are capable of reducing an amount of data that is to be analyzed by an AI model for detecting malicious behavior so that the amount is less than a token limit of the AI model. The example techniques are capable of doing so by taking semantic meaning of the data into account in addition to syntactic similarity/dissimilarity of the data. The amount of the data that is to be analyzed by the AI model may be reduced by a first autonomous AI agent using a first selected AI tool without compromising accuracy, precision, and/or reliability of a determination by a second autonomous AI agent whether the entity exhibits the malicious behavior. For instance, by selecting relevant data from a corpus of data (rather than an entirety of the corpus of data) for analysis by the second autonomous AI agent, the number of operations that are performed by the second autonomous AI agent to determine whether the entity exhibits the malicious behavior may be reduced. By selecting the relevant data from the corpus of data, truncation of the corpus of data and/or manual analysis of the corpus of data may be avoided. Accordingly, selecting the relevant data from the corpus of data by the first autonomous AI agent may increase accuracy, precision, and/or reliability of a maliciousness determination made by the second autonomous AI agent as to whether the entity exhibits the malicious behavior.

The example techniques are capable of determining validity of a maliciousness determination generated by the second autonomous AI agent, which may enable operations, which otherwise would have been performed to address a false positive produced by the second autonomous AI agent, to be avoided. For instance, a third autonomous AI agent uses a third selected AI tool to generate a validity determination, which indicates whether the maliciousness determination of the second autonomous AI agent is valid. By generating the validity determination, the third autonomous AI agent may increase accuracy, precision, and/or reliability of the maliciousness determination. For instance, the third autonomous AI agent may cause the second autonomous AI agent to revise its analysis of the relevant data.

The time that is consumed to determine whether the entity exhibits the malicious behavior may be reduced by employing a fourth autonomous AI agent that mediates between the second autonomous AI agent and the third autonomous AI agent. For instance, by generating an overriding validity determination, which indicates whether the validity determination that is generated by the third autonomous AI agent is to be overturned, the fourth autonomous AI agent may reduce an amount of time that is consumed by the second autonomous AI agent and the third autonomous AI agent to negotiate whether the entity exhibits the malicious behavior. For example, the fourth autonomous AI agent may stop the negotiation between the second autonomous AI agent and the third autonomous AI agent by generating the overriding validity determination.

By reducing the amount of time and/or resources that is consumed by a computing system to determine whether an entity exhibits malicious behavior, the efficiency of the computing system may be increased.

By reducing the amount of time that is consumed to determine whether an entity exhibits malicious behavior, the example techniques may increase a user experience and/or efficiency of an information technology (IT) professional who manages security of a system that stores or accesses the entity. The example techniques may increase a user experience and/or efficiency of an end user who accesses the entity, for example, by increasing security of the entity. The user experience of the IT professional and/or the end user may be increased in other ways, as well. For example, the user experience and/or the efficiency may be increased through a more accurate, precise, and/or reliable determination as to whether the entity exhibits malicious behavior. In another example, the user experience and/or the efficiency may be increased by reducing the number of false positives that are produced when determining whether entities exhibit malicious behavior. For instance, by reducing the number of false positives, an IT professional may focus on other tasks, which may increase security of a system that the IT professional manages.

FIG. 1 is a block diagram of an example multi-agent maliciousness analysis system 100 in accordance with an embodiment. Generally speaking, the multi-agent maliciousness analysis system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the multi-agent maliciousness analysis system 100 performs entity maliciousness analysis using autonomous AI agents. Detail regarding techniques for performing entity maliciousness analysis using autonomous AI agents is provided in the following discussion.

As shown in FIG. 1, the multi-agent maliciousness analysis system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the multi-agent maliciousness analysis system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read) by the computing system. The communications associated with the computing system may include communications received by the computing system and/or communications provided (e.g., transmitted) by the computing system. An example of a communication is an electronic message. Examples of a computer security program include Bitdefender® security program, developed and distributed by Bitdefender IPR Management Ltd.; Norton® security program, developed and distributed by Gen Digital Inc.; Avast® security program, developed and distributed by Avast Software S.R.O.; McAfee® security program, developed and distributed by McAfee, LLC; and Microsoft Defender® security program, developed and distributed by Microsoft Corporation. It will be recognized that the example techniques described herein may be implemented using a computer security program. For instance, a software product (e.g., a subscription service, a non-subscription service, or a combination thereof) may include the computer security program, and the software product may be configured to perform the example techniques, though the scope of the example embodiments is not limited in this respect.

The computer security program may be a cloud native application protection platform (CNAPP). A CNAPP is an all-in-one platform that unifies security and compliance capabilities to prevent, detect, and respond to cloud security threats. A CNAPP integrates multiple cloud security solutions, which traditionally have been siloed, into a common (e.g., single) user interface. The cloud security solutions may include cloud security posture management (CSPM), multipipeline development and operations (DevOps) security, a cloud workload protection platform (CWPP), cloud infrastructure entitlement management (CIEM), and cloud service network security (CSNS). CSPM provides a connected, prioritized view of potential vulnerabilities and misconfigurations across multi-cloud and hybrid environments. The CSPM continuously assesses overall security posture of a system and provides automated alerts and recommendations about critical issues that could expose the system to data breaches. The CSPM may include automated compliance management and remediation tools to identify and remedy compliance deficiencies. Multipipeline DevOps security provides a central console that enables management of DevOps security across multiple (e.g., all) pipelines. For instance, the multipipeline DevOps security may be used to reduce cloud misconfigurations and to scan new code to keep vulnerabilities therein from reaching a production environment. The multipipeline DevOps security may include infrastructure-as-code scanning tools that analyze configuration files from the earliest stages of development to confirm that new configuration files are compliant with security policies. A CWPP provides real-time detection and response to threats based on up-to-date information regarding multi-cloud workloads (e.g., virtual machines, containers, Kubernetes, databases, storage accounts, network layers, and app services). The CWPP may enable a quick investigation into threats and reduce the attack surface of a system. CIEM centralizes permissions management across a cloud and hybrid footprint, which inhibits (e.g., prevents) accidental or malicious misuse of permissions. CSNS complements the CWPP by protecting cloud infrastructure in real time. The CSNS may include any of a variety of security tools, including but not limited to distributed denial-of-service protection, web application firewalls, transport layer security examination, and load balancing.

A computer security program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program developed and distributed by Google Inc.; an Oracle Cloud® program developed and distributed by Oracle Corporation; an Amazon Web Services® program developed and distributed by Amazon.com, Inc.; a Salesforce® program developed and distributed by Salesforce.com, Inc.; an AppSource® program developed and distributed by Microsoft Corporation; an Azure® program developed and distributed by Microsoft Corporation; a GoDaddy® program developed and distributed by GoDaddy.com LLC; and a Rackspace® program developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include multi-agent maliciousness analysis logic 108 for illustrative purposes. The multi-agent maliciousness analysis logic 108 is configured to perform entity maliciousness analysis using autonomous AI agents. In an example implementation, a first autonomous AI agent in the multi-agent maliciousness analysis logic 108 selects relevant data from a corpus of data using a first selected AI tool as a result of the relevant data being associated with an entity. The first selected AI tool is selected by the first autonomous AI agent from a plurality of first AI tools in an AI model that are available to the first autonomous AI agent. A second autonomous AI agent in the multi-agent maliciousness analysis logic 108 generates a maliciousness determination, which indicates whether the entity exhibits malicious behavior, by analyzing the relevant data using a second selected AI tool. The second selected AI tool is selected by the second autonomous AI agent from a plurality of second AI tools in the AI model that are available to the second autonomous AI agent. A third autonomous AI agent in the multi-agent maliciousness analysis logic 108 generates a validity determination, which indicates whether the maliciousness determination is valid, by analyzing the maliciousness determination using a third selected AI tool. The third selected AI tool is selected by the third autonomous AI agent from a plurality of third AI tools in the AI model that are available to the third autonomous AI agent. As a result of an analysis that takes into consideration the validity determination, the multi-agent maliciousness analysis logic 108 triggers (e.g., automatically triggers) execution of an instruction that causes a security action to be performed with regard to the entity.

The multi-agent maliciousness analysis logic 108 may be implemented in various ways to perform entity maliciousness analysis using autonomous AI agents, including being implemented in hardware, software, firmware, or any combination thereof. For example, the multi-agent maliciousness analysis logic 108 may be implemented as computer program code configured to be executed in one or more processors. In another example, at least a portion of the multi-agent maliciousness analysis logic 108 may be implemented as hardware logic/electrical circuitry. For instance, at least a portion of the multi-agent maliciousness analysis logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the multi-agent maliciousness analysis logic 108 may be (or may be included in) a computer security program and/or a cloud computing program, though the scope of the example embodiments is not limited in this respect.

The multi-agent maliciousness analysis logic 108 is shown to be incorporated in the first server(s) 106A for illustrative purposes and is not intended to be limiting. It will be recognized that the multi-agent maliciousness analysis logic 108 (or any portion(s) thereof) may be incorporated in any one or more of the servers 106A-106N, any one or more of the user devices 102A-102M, or any combination thereof. For example, client-side aspects of the multi-agent maliciousness analysis logic 108 may be incorporated in one or more of the user devices 102A-102M, and server-side aspects of multi-agent maliciousness analysis logic 108 may be incorporated in one or more of the servers 106A-106N.

Figure 9:
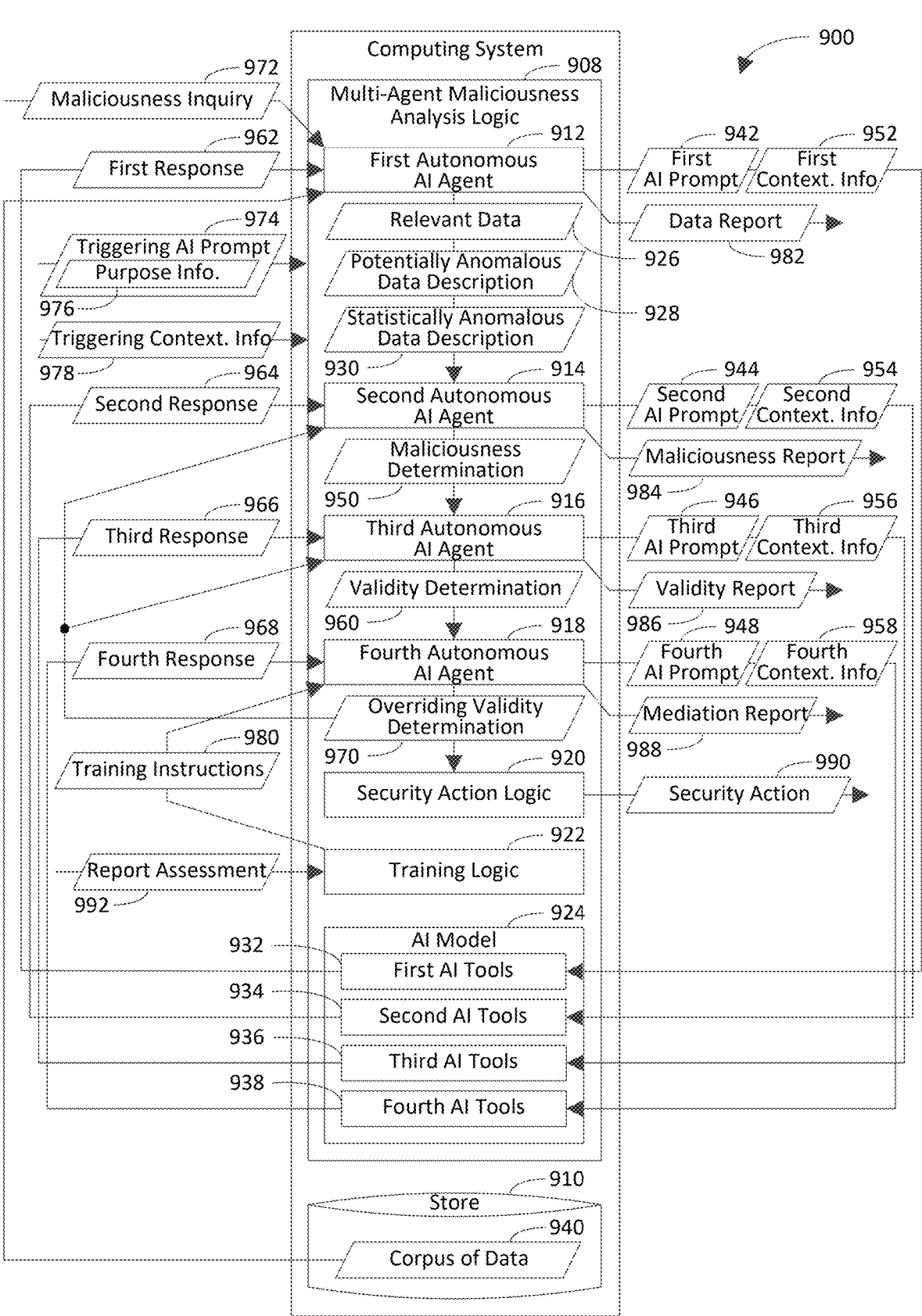
FIG. 9 is a block diagram of an example computing system in accordance with an embodiment.

FIGS. 2 and 5-8 depict flowcharts 200, 500, 600, 700, and 800 of example methods for performing entity maliciousness analysis using autonomous AI agents in accordance with embodiments. FIGS. 3-4 depict flowcharts 300 and 400 of example methods for selecting relevant data from a corpus of data in accordance with embodiments. Flowcharts 200, 300, 400, 500, 600, 700, and 800 may be performed by the first server(s) 106A shown in FIG. 1, for example. For illustrative purposes, flowcharts 200, 300, 400, 500, 600, 700, and 800 are described with respect to a computing system 900 shown in FIG. 9, which is an example implementation of the first server(s) 106A. As shown in FIG. 9, the computing system 900 includes multi-agent maliciousness analysis logic 908 and a store 910. The multi-agent maliciousness analysis logic 908 includes a first autonomous AI agent 912, a second autonomous AI agent 914, a third autonomous AI agent 916, a fourth autonomous AI agent 918, security action logic 920, training logic 922, and an AI model 924. The AI model 924 includes first AI tools 932, second AI tools 934, third AI tools 936, and fourth AI tools 938. The store 910 may be any suitable type of store. One type of store is a database. For instance, the store 910 may be a relational database, an entity-relationship database, an object database, an object relational database, an extensible markup language (XML) database, etc. The store 910 is shown to store a corpus of data 940 for non-limiting, illustrative purposes. Further structural and operational embodiments will be apparent to persons skilled in the relevant art(s) based on the discussion regarding flowcharts 200, 300, 400, 500, 600, 700, and 800.

As shown in FIG. 2, the method of flowchart 200 begins at step 202. In step 202, in response to receiving an inquiry that asks whether an entity exhibits malicious behavior, relevant data is select from a corpus of data by a first autonomous AI agent using a first selected AI tool as a result of the relevant data being associated with the entity. The first selected AI tool is selected by the first autonomous AI agent from a plurality of first AI tools in an AI model that are available to (e.g., capable of being used by or capable of being selected by) the first autonomous AI agent. An inquiry is a question, which solicits an answer. In an aspect, the inquiry is represented by an electrical signal (e.g., a digital signal or an analog signal). For instance, the electrical signal may be encoded (e.g., modulated) to convey the question. The inquiry may be manually initiated or automatically initiated. The inquiry may be initiated by a user (e.g., a human) or by a computing system. Examples of an entity include but are not limited to a user, an application, a computing system, and an Internet Protocol (IP) address. Examples of malicious behavior include but are not limited to accessing or deleting information in a manner that harms a system (e.g., eavesdropping on data exchanged between multiple entities); increasing privileges of an entity to enable the entity to perform operations that harm the system; overwhelming resource(s) of the system; misrepresenting an identity of an entity; injecting malicious software into the system; blocking access of user(s) to file(s) or system(s)

(e.g., using encryption); and injecting a malicious script into a web page. Relevant data is data having an attribute that corresponds to an attribute of an inquiry. For instance, if the inquiry pertains to an entity, data that pertains to the entity may be deemed relevant data. The corpus of data may be gathered from any suitable one or more sources, including but not limited to a local database, a remote database, webpages, and system communications. In an aspect, the relevant data is selected from the corpus of data as a result of the relevant data pertaining to security of the entity. In another aspect, the first autonomous AI agent is optimized to select the relevant data form the corpus of data.

In an example implementation, in response to receiving a maliciousness inquiry 972, the first autonomous AI agent 912 selects relevant data 926 from the corpus of data 940 using the first selected AI tool as a result of the relevant data 926 being associated with the entity. The maliciousness inquiry 972 asks whether the entity exhibits malicious behavior. The first autonomous AI agent 912 selects the first selected AI tool from the first AI tools 932 in the AI model 924 that are available to the first autonomous AI agent 912.

In an example security embodiment, the relevant data is selected from the corpus of data at step 202 as a result of the relevant data pertaining to security of the entity.

In an example log embodiment, selecting the relevant data form the corpus of data at step 202 includes selecting relevant logs from a plurality of logs by the first autonomous AI agent using the first selected AI tool as a result of the relevant logs being associated with the entity. In an aspect, the relevant logs memorialize events that occur with regard to the entity during a specified period of time.

At step 204, in response to receiving the relevant data from the first autonomous AI agent, a maliciousness determination is generated by a second autonomous AI agent by analyzing the relevant data using a second selected AI tool. The maliciousness determination indicates whether the entity exhibits the malicious behavior. In an aspect, the second autonomous AI agent uses the second selected AI tool to compare the relevant data to reference data, which is known to be associated with malicious behavior. In accordance with this aspect, the second selected AI tool determines an extent to which the relevant data corresponds to the reference data. For instance, the second selected AI tool may determine how similar the relevant data is to the reference data. The second selected AI tool may determine the extent to which the relevant data corresponds to the reference data by comparing embedding(s) of the relevant data and embedding(s) of the reference data. The second autonomous AI agent may generate the malicious determination to indicate that the entity exhibits the malicious behavior as a result of the extent satisfying a maliciousness criterion (e.g., as a result of the extent being greater than or equal to an extent threshold). For instance, the extent threshold may be 80%, 90%, or 95%. The second autonomous AI agent may generate the malicious determination to indicate that the entity does not exhibit the malicious behavior as a result of the extent not satisfying the maliciousness criterion (e.g., as a result of the extent being less than the extent threshold). The second AI tool is selected by the second autonomous AI agent from a plurality of second AI tools in the AI model that are available to the second autonomous AI agent.

In an aspect, the second autonomous AI agent is optimized to determine whether the entity exhibits the malicious behavior. In an example implementation, in response to receiving the relevant data 926 from the first autonomous AI agent 912, the second autonomous AI agent 914 generates a maliciousness determination 950, which indicates whether the entity exhibits the malicious behavior, by analyzing the relevant data 926 using the second selected AI tool. The second selected AI tool is selected by the second autonomous AI agent 914 from the second AI tools 934 in the AI model 924 that are available to the second autonomous AI agent 914.

At step 206, a validity determination is generated by a third autonomous AI agent by analyzing the maliciousness determination using a third selected AI tool. The validity determination indicates whether the maliciousness determination is valid (e.g., accurate). In an aspect, the third autonomous AI agent uses the third selected AI tool to compare the maliciousness determination and the relevant data on which the maliciousness determination is based to reference maliciousness determination(s) and reference data on which the reference maliciousness determination(s) are based. In accordance with this aspect, the third selected AI tool determines an extent to which the maliciousness determination and the relevant data correspond to the reference maliciousness determination(s) and the reference data. For instance, the third selected AI tool may determine how similar the maliciousness determination and the relevant data are to the reference maliciousness determination(s) and the reference data. The third selected AI tool may determine the extent to which the maliciousness determination and the relevant data correspond to the reference maliciousness determination(s) and the reference data by comparing embeddings of the maliciousness determination and the relevant data and embeddings of the reference maliciousness determination(s) and the reference data. The third autonomous AI agent may generate the validity determination to indicate that the maliciousness determination is valid as a result of the extent satisfying a validity criterion (e.g., as a result of the extent being greater than or equal to an extent threshold). For instance, the extent threshold may be 80%, 90%, or 95%. The third autonomous AI agent may generate the validity determination to indicate that the maliciousness determination is not valid as a result of the extent not satisfying the maliciousness criterion (e.g., as a result of the extent being less than the extent threshold). The third selected AI tool is selected by the third autonomous AI agent from a plurality of third AI tools in the AI model that are available to the third autonomous AI agent. In an aspect, the third autonomous AI agent is optimized to determine whether the maliciousness determination is valid.

In an example implementation, the third autonomous AI agent 916 generates a validity determination 960, which indicates whether the maliciousness determination 950 is valid, by analyzing the maliciousness determination 950 using the third selected AI tool. The third selected AI tool is selected by the third autonomous AI agent 916 from the third AI tools 936 in the AI model 924 that are available to the third autonomous AI agent 916.

At step 208, as a result of an analysis that takes into consideration the validity determination, execution of an instruction that causes a security action to be performed with regard to the entity is triggered (e.g., automatically triggered). In an example implementation, as a result of the analysis, which takes into consideration the validity determination 960, the security action logic 920 triggers execution of an instruction that causes a security action 990 to be performed with regard to the entity.

In an example embodiment, triggering the execution of the instruction at step 208 causes access of a user to the entity to be blocked.

In another example embodiment, triggering the execution of the instruction at step 208 causes a statement to be provided via a user interface. The statement indicates whether the entity exhibits malicious behavior.

In an example prompting embodiment, selecting the relevant data from the corpus of data at step 202 includes triggering, by the first autonomous AI agent, the first selected AI tool to select the relevant data from the corpus of data by providing a first AI prompt as an input to the first selected AI tool. The first AI prompt identifies the corpus of data and requests selection of data that is associated with the entity from the corpus of data. In an example implementation, the first autonomous AI agent 912 triggers the first selected AI tool to select the relevant data 926 from the corpus of data 940 by providing a first AI prompt 942 as an input to the first selected AI tool. The first AI prompt 942 identifies the corpus of data 940 and requests selection of data that is associated with the entity from the corpus of data 940. In an aspect, the first autonomous AI agent 912 provides first contextual information 952 together with the first AI prompt 942 as inputs to the first selected AI tool. In accordance with this aspect, the first contextual information includes context regarding the first AI prompt 942. In another aspect, the first selected AI tool generates a first response 962 to the first AI prompt 942. In accordance with this aspect, the first response 962 indicates (e.g., identifies, specifies, or describes) the relevant data 926. In further accordance with this aspect, the first autonomous AI agent may select the relevant data 926 based on (e.g., based at least on) the first response 962.

In accordance with the prompting embodiment, generating the maliciousness determination at step 204 includes triggering, by the second autonomous AI agent, the second selected AI tool to determine whether the entity exhibits the malicious behavior by providing a second AI prompt together with second contextual information as inputs to the second selected AI tool. The second AI prompt requests a determination whether the entity exhibits the malicious behavior. The second contextual information includes the relevant data. The second contextual information includes context regarding the second AI prompt. In an example implementation, the second autonomous AI agent 914 triggers the second selected AI tool to determine whether the entity exhibits the malicious behavior by providing a second AI prompt 944 together with second contextual information 954 as inputs to the second selected AI tool. The second AI prompt 944 requests the determination whether the entity exhibits the malicious behavior. The second contextual information 954 includes the relevant data 926. The second contextual information 954 includes context regarding the second AI prompt 944. In an aspect, the second selected AI tool generates a second response 964 to the second AI prompt 944. In accordance with this aspect, the second response 964 indicates whether the entity exhibits the malicious behavior. In further accordance with this aspect, the second autonomous AI agent 914 may generate the maliciousness determination 950 based on the second response 964.

In further accordance with the prompting embodiment, generating the validity determination at step 206 includes triggering, by the third autonomous AI agent, the third selected AI tool to determine whether the maliciousness determination is valid by providing a third AI prompt together with third contextual information as inputs to the third selected AI tool. The third AI prompt requests a determination whether the maliciousness determination is valid. The third contextual information includes the relevant data and the maliciousness determination. The third contextual information includes context regarding the third AI prompt. In an example implementation, the third autonomous AI agent 916 triggers the third selected AI tool to determine whether the maliciousness determination 950 is valid by providing a third AI prompt 946 together with third contextual information 956 as inputs to the third selected AI tool. The third AI prompt 946 requests the determination whether the maliciousness determination 950 is valid. The third contextual information 956 includes the relevant data 926 and the maliciousness determination 950. The third contextual information 956 includes context regarding the third AI prompt 946. In an aspect, the third selected AI tool generates a third response 966 to the third AI prompt 946. In accordance with this aspect, the third response 966 indicates whether the maliciousness determination 950 is valid. In further accordance with this aspect, the third autonomous AI agent 916 may generate the validity determination 960 based on the third response 966.

Any suitable sampling technique may be used to select the relevant data from the corpus of data at step 202. Examples of a sampling technique include but are not limited to a gradient technique, a greedy distance maximization technique, and a clustering technique. In the gradient technique, a steepest descent direction is approximated by randomly sampling gradients within a proximity of a current point to provide an approximated result, which is normalized to have unit form.

In the greedy distance maximization technique, calculations are performed on a plurality of embeddings that represent the corpus of data. An embedding is a numerical representation of data (e.g., a log or a portion thereof). For instance, the embedding may be generated by converting the data (e.g., text) into a vector (e.g., an array of numbers). In an aspect, the embedding represents the meaning and the context of the data. The plurality of embeddings may serve as generic representations of the corpus of data (e.g., a plurality of logs) without requiring explicit feature engineering. The greedy distance maximization technique will now be described with regard to the log embodiment mentioned above with reference to step 202, thought it will be recognized that the greedy distance maximization technique is applicable to any suitable type of data. In accordance with the log embodiment, each embedding may represent a respective word or combination of words in a corresponding log. For example, each embedding may represent a log line (e.g., a row in a table) in a log. In accordance with this example, a log that includes N log lines is represented by N embeddings, where N is a positive integer. In further accordance with this example, first embeddings may be created to represent respective portions (e.g., words) in a log line, and the first embeddings may be combined to provide a second embedding that represents an entirety of the log line. For instance, the first embeddings may be combined by calculating a mean or a median of the first embeddings to provide the second embedding. In another example, each embedding may represent an entirety of a respective log. In accordance with the log embodiment, the plurality of embeddings may be compared to determine which logs in the plurality of logs are to be selected. For example, contrastive learning may be used to select the relevant logs from the plurality of logs. Contrastive learning is a machine learning technique in which a model is trained to distinguish between similar and dissimilar data points. For instance, the model may be trained to maximize similarity of representations of similar data points and minimize similarity of representations of dissimilar data points. A data point is an element (e.g., an identifiable element) in a dataset. Examples of an element include but are not limited to a word, a combination of words, a log line, and a log In accordance with the greedy distance maximization technique, a first log embedding is selected initially. For example, the first log embedding may be selected based on a reference point in embedding space. In an aspect, the reference point is a center (e.g., a mean or a median) of all embeddings. For instance, the first embedding may be selected because it is closest to the reference point. Next, a second embedding is selected based on the embedding being farthest from the first embedding in the embedding space. Next, for each remaining embedding, a minimum distance to each embedding that has been selected so far is determined, and a third embedding having the largest minimum distance to any selected embedding is selected. This means, for each remaining embedding, determining the distance to each selected embedding, selecting the minimum of these distances (the minimum distance), and identifying the largest of these minimum distances (the maximum minimum distance). This "max-min" operation ensures diversity because it ensures that subsequent selections are relatively distant from all embeddings that have been selected so far. This process repeats until a predetermined number, N, of embeddings have been selected.

In an example greedy distance maximization embodiment, selecting the relevant data from the corpus of data at step 202 includes one or more of the steps shown in flowchart 300 of FIG. 3. As shown in FIG. 3, the method of flowchart 300 begins at step 302. In step 302, first relevant data is selected from the corpus of data by the first autonomous AI agent using a sampling tool as a result of a first embedding that represents the first relevant data corresponding to a center (e.g., an average or a median) of a plurality of embeddings that represent the corpus of data. The sampling tool is selected by the first autonomous AI agent from the plurality of first AI tools in the AI model that are available to the first autonomous AI agent. In an example implementation, the first autonomous AI agent 912 selects first relevant data from the corpus of data 940 using the sampling tool as a result of the first embedding, which represents the first relevant data, corresponding to the center of the plurality of embeddings, which represent the corpus of data 940. The first autonomous AI agent 912 selects the sampling tool from the first AI tools 932 in the AI model 924 that are available to the first autonomous AI agent 912.

At step 304, second relevant data is selected from the corpus of data by the first autonomous AI agent using the sampling tool as a result of a distance between a second embedding that represents the second relevant data and the first embedding being greater than distances between others of the plurality of embeddings (i.e., each of the plurality of embeddings, except the first and second embeddings) and the first embedding. In an example implementation, the first autonomous AI agent 912 selects the second relevant data from the corpus of data 940 using the sampling tool as a result of the distance between the second embedding, which represents the second relevant data, and the first embedding being greater than the distance between each of the other embeddings in the plurality of embeddings (e.g., each of the plurality embeddings, except the first embedding and the second embedding) and the first embedding.

At step 306, third relevant data is selected from the corpus of data by the first autonomous AI agent using the sampling tool as a result of a first distance or a second distance, whichever is less, being greater than third distances or fourth distances, whichever are less. The first distance is between a third embedding that represents the third relevant data and the first embedding. The second distance is between the third embedding and the second embedding. The third distances are between others of the plurality of embeddings (i.e., each of the plurality of embeddings, except the first, second, and third embeddings) and the first embedding. The fourth distances are between the others of the plurality of embeddings (i.e., each of the plurality of embeddings, except the first, second, and third embeddings) and the second embedding. In an example implementation, the first autonomous AI agent 912 selects the third relevant data from the corpus of data 940 using the sampling tool as a result of whichever is less of the first distance or the second distance being greater than whichever is less of each of the third distances or each of the fourth distances.

In an aspect of the greedy distance maximization embodiment, the first relevant data is selected from the corpus of data at step 302 using the sampling tool as a result of the embedding that represents the first relevant data corresponding to an average (i.e., mean) of the plurality of embeddings.

In another aspect of the greedy distance maximization embodiment, the first relevant data is selected from the corpus of data at step 302 using the sampling tool as a result of the embedding that represents the first relevant data corresponding to a median of the plurality of embeddings.

Each of the distances described above with regard to steps 304 and 306 may be any suitable type of distance, including but not limited to a Euclidian distance (a.k.a. Pythagorean distance), a Manhattan distance, or a Cosine distance. A Euclidian distance between two vectors is the length of the shortest line between the vectors. For example, the Euclidian distance, $D_E$, between two 2-dimensional vectors (a, b) and (x, y) may be represented as $D_E=[(a-x)^2+ (b-y)^2]^{(1/2)}$. In another example, the Euclidian distance, $D_E$, between two 3-dimensional vectors (a, b, c) and (x, y, z) may be represented as $D_E=[(a-x)^2+(b-y)^2+(c-z)^2]^{(1/2)}$. A Manhattan distance between two vectors is a sum of absolute differences between corresponding components of the vectors. For example, the Manhattan distance, $D_M$, between two 2-dimensional vectors (a, b) and (x, y) may be represented as $D_M=Abs(a-x)+Abs(b-y)$. In another example, the Manhattan distance, $D_M$, between two 3-dimensional vectors (a, b, c) and (x, y, z) may be represented as $D_M=Abs(a-x)+Abs(b-y)+Abs(c-z)$. A Cosine distance between two vectors is equal to a dot product of the vectors divided by a product of the magnitudes of the vectors. Accordingly, the Cosine distance, $D_C$, between vectors X and Y may be represented as $D_C=(X \cdot Y)/(\|X\|*\|Y\|)$.

It will be recognized that flowchart 300 may include additional steps to select additional relevant data (fourth relevant data, fifth relevant data, and so on) from the corpus of data.

In an example clustering embodiment, selecting the relevant data from the corpus of data at step 202 includes one or more of the steps shown in flowchart 400 of FIG. 4. As shown in FIG. 4, the method of flowchart 400 begins at step 402. In step 402, subsets of the corpus of data are clustered into respective clusters by the first autonomous AI agent using a clustering tool. The subsets of the corpus of data are clustered by analyzing a plurality of embeddings that represent the corpus of data using the clustering tool as a result of the subsets corresponding to respective attributes. For example, a first subset of the corpus of data may be clustered into a first cluster as a result of the data in the first subset sharing a first attribute. A second subset of the corpus of data may be clustered into a second cluster as a result of the data in the second subset sharing a second attribute, and so on.

The clustering tool is selected by the first autonomous AI agent from the plurality of first AI tools in the AI model that are available to the first autonomous AI agent. In an example implementation, the first autonomous AI agent 912 clusters subsets of the corpus of data 940 into respective clusters using the clustering tool by analyzing a plurality of embeddings, which represent the corpus of data 940, using the clustering tool as a result of the subsets corresponding to respective attributes. The first autonomous AI agent 912 selects the clustering tool from the first AI tools 932 in the AI model 924 that are available to the first autonomous AI agent 912.

In an aspect, the clustering tool executes a clustering algorithm to cluster the subsets of the corpus of data into the respective clusters at step 402. The clustering algorithm may be density-based, distribution-based, centroid-based, or hierarchical-based. A density-based clustering algorithm clusters data points (e.g., logs), which are included in an area having a relatively high concentration of data points that is surrounded by area(s) having a relatively low concentration of data points, into a cluster. A distribution-based clustering algorithm clusters data points into clusters based on a distance of each data point to the center of each of multiple clusters, such that the data point is included in the cluster having a center that is closer to the data point than the center of each other cluster. A centroid-based clustering algorithm clusters data points into clusters based on a squared distance of each data point from each of multiple centroids in the data, such that the data point is included in the cluster corresponding to the centroid with the shortest squared distance to the data point. A hierarchical-based clustering algorithm clusters data points based on which of multiple hierarchical levels of a hierarchy includes the data points. For example, data points corresponding to a first hierarchical level are clustered into a first cluster; data points corresponding to a second hierarchical level are clustered into a second cluster, and so on.

At step 404, the relevant data is selected from the respective clusters by the first autonomous AI agent using the first selected AI tool. For example, a designated (e.g., fixed) number of data points (e.g., 1, 2, 3, or 10) may be selected from each cluster. In an example implementation, the first autonomous AI agent 912 selects the relevant data 926 from the respective clusters using the first selected AI tool.

In an aspect of the clustering embodiment, the clustering tool performs a K-means clustering technique. The K-means clustering technique is an unsupervised learning centroid-based clustering technique. In an aspect, the K-means clustering technique attempts to minimize the variance of data points within each cluster.

In another aspect of the clustering embodiment, the clustering technique is a density-based spatial clustering of applications with noise (DBSCAN) clustering technique. As indicated by its name, the DBSCAN clustering technique is a density-based clustering technique. The DBSCAN clustering technique defines arbitrarily shaped clusters based on density of data points in regions that are separated by areas of low-density.

Other examples of a clustering technique that may be performed by the clustering tool include but are not limited to a Gaussian mixture clustering technique, a balance iterative reducing and clustering using hierarchies (BIRCH) clustering technique, an affinity propagation clustering technique, a mean-shifting clustering technique, an ordering points to identify the clustering structure (OPTICS) clustering technique, and an agglomerative hierarchy clustering technique.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example potential anomaly embodiment, the method of flowchart 200 further includes, in response to receiving the inquiry that asks whether the entity exhibits the malicious behavior, identifying, by the first autonomous AI agent, potentially anomalous data in at least a portion of the corpus of data (e.g., in the relevant data or in an entirety of the corpus of data) using an anomaly detection tool. The potentially anomalous data is identified as a result of differences between embeddings of the potentially anomalous data and a reference embedding that corresponds to at least the portion of the corpus of data being greater than differences between embeddings of other data in at least the portion of the corpus of data and the reference embedding. The anomaly detection tool is selected by the first autonomous AI agent from the plurality of first AI tools in the AI model that are available to the first autonomous AI agent. In an example implementation, in response to receiving the maliciousness inquiry 972, the first autonomous AI agent 912 identifies the potentially anomalous data in at least the portion of the corpus of data 940 (e.g., in the relevant data 926 or in an entirety of the corpus of data 940) using the anomaly detection tool. The first autonomous AI agent 912 identifies the potentially anomalous data as a result of differences between the embeddings of the potentially anomalous data and the reference embedding, which corresponds to at least the portion of the corpus of data 940, being greater than the differences between the embeddings of the other data in at least the portion of the corpus of data 940 and the reference embedding. The first autonomous AI agent 912 selects the anomaly detection tool from the first AI tools 932 in the AI model 924 that are available to the first autonomous AI agent 912. The first autonomous AI agent 912 generates a potentially anomalous data description 928 to describe the potentially anomalous data. In accordance with the potential anomaly embodiment, the validity determination is generated by the third autonomous AI agent by analyzing the maliciousness determination and a description of the potentially anomalous data using the third selected AI tool. In an example implementation, the third autonomous AI agent 916 generates the validity determination 960 by analyzing the maliciousness determination 950 and the potentially anomalous data description 928 using the third selected AI tool. For instance, the third autonomous AI agent 916 may receive the potentially anomalous data description 928 from the first autonomous AI agent 912 or the second autonomous AI agent 914.

In an aspect of the potential anomaly embodiment, the potentially anomalous data is identified by determining a plurality of distances between the reference embedding and a plurality of respective embeddings of a plurality of respective data points in the corpus of data. In an example, the reference embedding corresponds to a center (e.g., average or median) of the plurality of embeddings. In accordance with this aspect, the potentially anomalous data is identified based on (e.g., based at least on) embeddings of respective data points in the identified data being respective distances from the reference embedding that are greater than the distances of the embeddings of the other data points in at least the portion of the corpus of data from the reference embedding. For example, the embedding of each data point in the potentially anomalous data may be farther than the embedding of each other data point in at least the portion of the corpus of data (i.e., each data point in at least the portion of the corpus of data that is not included in the potentially anomalous data) from the reference embedding. In an aspect, the potentially anomalous data is defined as N data points in at least the portion of the corpus of data having respective embeddings that are farthest from the reference embedding, where N is a positive integer. In another aspect, the potentially anomalous data is defined to include data points in at least the portion of the corpus of data having respective embeddings that are at least a threshold distance from the reference embedding.

In another aspect of the potential anomaly embodiment, the potentially anomalous data is identified by the first autonomous AI agent in at least the portion of the corpus of data using an isolation forest tool that performs an isolation forest anomaly detection technique on at least the portion of the corpus of data. In accordance with this aspect, the isolation forest tool is selected by the first autonomous AI agent from the plurality of first AI tools in the AI model that are available to the first autonomous AI agent. In an aspect, data points in the corpus of data are represented by respective nodes in a tree. In accordance with this aspect, data points having nodes that are closest to a root node of the tree define the potentially anomalous data. For example, the nodes that are closest to the root node may be determined based on the nodes having a path length to the root node that is less than or equal to a specified path length. The path length may be based on (e.g., correspond to) a number of branches (a.k.a. splits) that are encountered between the node and the root node. In an example implementation, the first autonomous AI agent 912 identifies the potentially anomalous data in at least the portion of the corpus of data 940 using the isolation forest tool, which performs the isolation forest anomaly detection technique on at least the portion of the corpus of data 940. In accordance with this implementation, the first autonomous AI agent 912 selects the isolation forest tool from the first AI tools 932 in the AI model 924 that are available to the first autonomous AI agent 912.

In yet another aspect of the potential anomaly embodiment, the potentially anomalous data is identified using an isolation-based neural network embeddings (INNE) technique.

In an example statistical anomaly embodiment, the method of flowchart 200 further includes, in response to receiving the inquiry that asks whether the entity exhibits the malicious behavior, identifying, by the first autonomous AI agent, statistically anomalous data in the relevant data using an anomaly detection tool. The statistically anomalous data is identified as a result of events indicated by embeddings of the statistically anomalous data occurring more than an expected (e.g., threshold) number of times during a period of time. The anomaly detection tool is selected by the first autonomous AI agent from the plurality of first AI tools in the AI model that are available to the first autonomous AI agent. In an aspect, the statistically anomalous data is identified by performing a statistical analysis on the relevant data. In accordance with this aspect, the statistical analysis includes making a determination that the events indicated by the embeddings of the statistically anomalous data occur more than the expected number of times during the period of time. In an example implementation, in response to receiving the maliciousness inquiry 972, the first autonomous AI agent 912 identifies the statistically anomalous data in the relevant data 926 using the anomaly detection tool as a result of events indicated by the embeddings of the statistically anomalous data occurring more than the expected number of times during the period of time. In accordance with this implementation, the first autonomous AI agent 912 selects the anomaly detection tool from the first AI tools 932 in the AI model 924 that are available to the first autonomous AI agent 912. The first autonomous AI agent 912 generates a statistically anomalous data description 930 to describe the statistically anomalous data.

In accordance with the statistical anomaly embodiment, the validity determination is generated at step 206 by analyzing the maliciousness determination and a description of the statistically anomalous data using the third selected AI tool. In an example implementation, the third autonomous AI agent 916 generates the validity determination 960 by analyzing the maliciousness determination 950 and the statistically anomalous data description 930 using the third selected AI tool. For instance, the third autonomous AI agent 916 may receive the statistically anomalous data description 930 from the first autonomous AI agent 912 or the second autonomous AI agent 914.

In an aspect of the statistical anomaly embodiment, the statistically anomalous data is identified in the relevant data by the first autonomous AI agent using a frequency analysis tool that performs a frequency analysis technique on the relevant data. For example, the frequency analysis technique may be used to determine that a data point indicating that a person accesses a resource at an unusual time (e.g., 2:00 am) is a statistically anomalous data point. In another example, the frequency analysis technique may be used to determine that a data point indicating that a resource that historically has been accessed only from the United States was accessed once from the United Kingdom is a statistically anomalous data point. The frequency analysis tool is selected by the first autonomous AI agent from the plurality of first AI tools in the AI model that are available to the first autonomous AI agent. In an example implementation, the first autonomous AI agent 912 identifies the statistically anomalous data in the relevant data 926 using the frequency analysis tool, which performs the frequency analysis technique on the relevant data 926. In accordance with this implementation, the first autonomous AI agent 912 selects the frequency analysis tool from the first AI tools 932 in the AI model 924 that are available to the first autonomous AI agent 912.

In another aspect of the statistical anomaly embodiment, the statistically anomalous data is identified in the relevant data by the first autonomous AI agent using a p-value analysis tool that performs a p-value analysis technique on the relevant data. The p-value analysis tool is selected by the first autonomous AI agent from the plurality of first AI tools in the AI model that are available to the first autonomous AI agent. In an example implementation, the first autonomous AI agent 912 identifies the statistically anomalous data in the relevant data 926 using the p-value analysis tool, which performs the p-value analysis technique on the relevant data 926. In accordance with this implementation, the first autonomous AI agent 912 selects the p-value analysis tool from the first AI tools 932 in the AI model 924 that are available to the first autonomous AI agent 912.

In an example embodiment, the method of flowchart 200 further includes training the second selected AI tool using the validity determination. In an example implementation, the third autonomous AI agent 916 trains the second selected AI tool using the validity determination 960. In an aspect, the third autonomous AI agent 916 recommends additional data for consideration by the second autonomous AI agent 914 (e.g., by the second selected AI tool, which is used by the second autonomous AI agent 914) to be used in determining whether the entity exhibits the malicious behavior. By recommending the additional data for consideration by the second autonomous AI agent 914, the third autonomous AI agent 916 may cause the second autonomous AI agent 914 to provide a recommendation to the first autonomous AI agent 912. The recommendation provided by the second autonomous AI agent 914 may recommend that the first autonomous AI agent 912 select the additional data from the corpus of data 940 (e.g., using the first selected AI tool). In another aspect, the third autonomous AI agent 916 recommends another AI tool, which is different from the second selected AI tool, to be used by the second autonomous AI agent 914 (e.g., in addition to or in lieu of the second selected AI tool) in determining whether the entity exhibits the malicious behavior.

In another example embodiment, the method of flowchart 200 further includes triggering the first autonomous AI agent to select the relevant data from the corpus of data by providing an AI prompt, which identifies the corpus of data, as an input to the first autonomous AI agent. In an aspect, the AI prompt indicates a location of the corpus of data. The AI prompt specifies that a purpose of the first autonomous AI agent is to select the relevant data from the corpus of data. In an example implementation, the security action logic 920 triggers the first autonomous AI agent 912 to select the relevant data 926 from the corpus of data 940 by providing a triggering AI prompt 974, which identifies the corpus of data 940, as an input to the first autonomous AI agent 912. In accordance with this implementation, the triggering AI prompt 974 includes purpose information 976, which specifies that the purpose of the first autonomous AI agent 912 is to select the relevant data 926 from the corpus of data 940.

In yet another example embodiment, the method of flowchart 200 further includes triggering the second autonomous AI agent to generate the maliciousness determination by providing an AI prompt together with contextual information as inputs to the second autonomous AI agent. The AI prompt specifies that a purpose of the second autonomous AI agent is to determine whether the entity exhibits the malicious behavior. The contextual information includes the relevant data. The contextual information includes context regarding the AI prompt. In an example implementation, the first autonomous AI agent 912 triggers the second autonomous AI agent 914 to generate the maliciousness determination 950 by providing the triggering AI prompt 974 together with the triggering contextual information 978 as inputs to the second autonomous AI agent 914. In accordance with this implementation, the triggering AI prompt 974 includes the purpose information 976, which specifies that the purpose of the second autonomous AI agent 914 is to determine whether the entity exhibits the malicious behavior. In further accordance with this implementation, the triggering contextual information 978 includes the relevant data 926. The triggering contextual information 978 includes context regarding the triggering AI prompt 974.

In still another example embodiment, the method of flowchart 200 further includes triggering the third autonomous AI agent to generate the validity determination by providing an AI prompt together with contextual information as inputs to the third autonomous AI agent. The AI prompt specifies that a purpose of the third autonomous AI agent is to determine whether the maliciousness determination is valid. The contextual information includes the relevant data and the maliciousness determination. The contextual information includes context regarding the AI prompt. In an example, the contextual information may further include a summary of reasoning used by the second autonomous AI agent (e.g., the second selected AI tool used by the second autonomous AI agent) in generating the maliciousness determination. In an example implementation, the second autonomous AI agent 914 triggers the third autonomous AI agent 916 to generate the validity determination 960 by providing the triggering AI prompt 974 together with the triggering contextual information 978 as inputs to the third autonomous AI agent 916. In accordance with this implementation, the triggering AI prompt 974 includes the purpose information 976, which specifies that the purpose of the third autonomous AI agent 916 is to determine whether the maliciousness determination is valid. In further accordance with this implementation, the triggering contextual information 978 includes the relevant data 926 and the maliciousness determination 950. The triggering contextual information 978 includes context regarding the triggering AI prompt 974.

In an example mediation embodiment, the validity determination indicates that the maliciousness determination is invalid. In accordance with the mediation embodiment, the method of flowchart 200 further includes generating, by a fourth autonomous AI agent, an overriding validity determination using a fourth selected AI tool. The overriding validity determination indicates whether the validity determination that is generated by the third autonomous AI agent is to be overturned. The overriding validity determination is generated by performing the analysis of the maliciousness determination and the validity determination. The fourth autonomous AI agent may be deemed to mediate between the second autonomous AI agent and the third autonomous AI agent by performing the analysis of the maliciousness determination and the validity determination. In an aspect, the fourth autonomous AI agent is optimized to mediate between the second and third autonomous AI agents. In another aspect, the fourth autonomous AI agent is optimized to determine whether the validity determination that is generated by the third autonomous AI agent is to be overturned. The fourth selected AI tool is selected by the fourth autonomous AI agent from a plurality of fourth AI tools in the AI model that are available to the fourth autonomous AI agent. In an example implementation, the fourth autonomous AI agent 918 generates an overriding validity determination 970 using the fourth selected AI tool. The overriding validity determination 970 indicates whether the validity determination 960, which is generated by the third autonomous AI agent 916, is to be overturned. The third autonomous AI agent 916 generates the overriding validity determination 970 using the fourth selected AI tool by performing the analysis of the maliciousness determination 950 and the validity determination 960. The fourth autonomous AI agent 918 selects the fourth selected AI tool from the fourth AI tools 938 in the AI model 924 that are available to the fourth autonomous AI agent 918. In accordance with the mediation embodiment, the security action is performed using the overriding validity determination. In an example implementation, the security action logic 920 triggers (e.g., automatically triggers) the execution of the instruction that causes the security action 990 to be performed with regard to the entity using the overriding validity determination 970.

In an aspect of the mediation embodiment, generating the overriding validity determination includes triggering, by the fourth autonomous AI agent, the fourth selected AI tool to determine whether the validity determination that is generated by the third autonomous AI agent is to be overturned by providing an AI prompt together with contextual information as inputs to the fourth selected AI tool. The AI prompt requests a determination whether the validity determination that is generated by the third autonomous AI agent is to be overturned. The contextual information comprises the relevant data, the maliciousness determination, and the validity determination. The contextual information comprises context regarding the AI prompt. In an example implementation, the fourth autonomous AI agent 918 triggers the fourth selected AI tool to determine whether the validity determination 960, which is generated by the third autonomous AI agent 916, is to be overturned by providing a fourth AI prompt 948 together with fourth contextual information 958 as inputs to the fourth selected AI tool. The fourth AI prompt 948 requests a determination whether the validity determination 960, which is generated by the third autonomous AI agent 916, is to be overturned. The fourth contextual information 958 comprises the relevant data 926, the maliciousness determination 950, and the validity determination 960. For instance, the fourth autonomous AI agent 918 may receive the relevant data 926 from the first autonomous AI agent 912, the second autonomous AI agent 914, or the third autonomous AI agent 916. The fourth autonomous AI agent 918 may receive the maliciousness determination 950 from the second autonomous AI agent 914 or the third autonomous AI agent 916. The fourth contextual information 958 comprises context regarding the fourth AI prompt 948. In an aspect, the fourth selected AI tool generates a fourth response 968 to the fourth AI prompt 948. In accordance with this aspect, the fourth response 968 indicates whether the validity determination 960 is to be overturned. In further accordance with this aspect, the fourth autonomous AI agent 918 may generate the overriding validity determination 970 based on the fourth response 968.

In another aspect of the mediation embodiment, the method of flowchart 200 further includes triggering the fourth autonomous AI agent to generate the overriding validity determination by providing an AI prompt and contextual information as inputs to the fourth autonomous AI agent. The AI prompt specifies that a purpose of the fourth autonomous AI agent is to determine whether the validity determination is to be overturned. The contextual information includes the relevant data, the maliciousness determination, and the validity determination. The contextual information includes context regarding the AI prompt. In an example, the contextual information may further include a summary of reasoning used by the second autonomous AI agent (e.g., the second selected AI tool used by the second autonomous AI agent) in generating the maliciousness determination and/or a summary of reasoning used by the third autonomous AI agent (e.g., the third selected AI tool used by the third autonomous AI agent) in generating the validity determination. In an example implementation, the third autonomous AI agent 916 triggers the fourth autonomous AI agent 918 to generate the overriding validity determination 970 by providing a triggering AI prompt 974 and triggering contextual information 978 as inputs to the fourth autonomous AI agent 918. In accordance with this implementation, the triggering AI prompt 974 includes the purpose information 976, which specifies that the purpose of the fourth autonomous AI agent 918 is to determine whether the validity determination 960 is to be overturned. In further accordance with this implementation, the triggering contextual information 978 includes the relevant data 926, the maliciousness determination 950, and the validity determination 960. The triggering contextual information 978 includes context regarding the triggering AI prompt 974.

In an example training embodiment, the method of flowchart 200 further includes one or more of the steps shown in flowchart 500 of FIG. 5. As shown in FIG. 5, the method of flowchart 500 begins at step 502. In step 502, a mediation report that indicates the overriding maliciousness determination is generated by the fourth autonomous AI agent. In an example implementation, the fourth autonomous AI agent 918 generates a mediation report 988, which indicates the overriding maliciousness determination 970.

At step 504, as a result of the fourth autonomous AI agent generating the mediation report, an assessment of the mediation report is received from a user. For instance, the user may be an IT professional (e.g., a security analyst or a system administrator) or an end user. The assessment indicates a recommended change to be incorporated into the analysis performed by the fourth autonomous AI agent using the fourth selected AI tool. In an example implementation, as a result of the fourth autonomous AI agent 918 generating the mediation report 988, the training logic 922 receives a report assessment 992, which assesses the mediation report 988, from the user. The report assessment 992 indicates a recommended change to be incorporated into the analysis performed by the fourth autonomous AI agent 918 using the fourth selected AI tool.

At step 506, the fourth autonomous AI agent is trained using the assessment. In an example implementation, the training logic 922 trains the fourth autonomous AI agent 918 using the report assessment 992.

Figure 6:
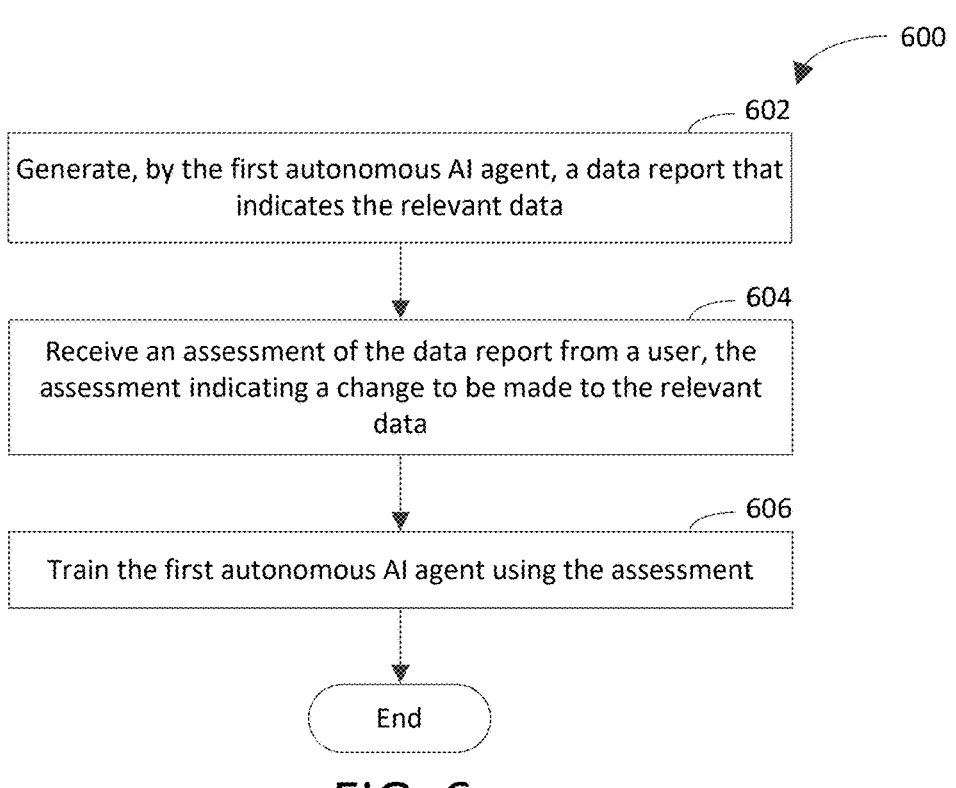

In another example training embodiment, the method of flowchart 200 further includes one or more of the steps shown in flowchart 600 of FIG. 6. As shown in FIG. 6, the method of flowchart 600 begins at step 602. In step 602, a data report that indicates the relevant data is generated by the first autonomous AI agent. In an example implementation, the first autonomous AI agent 912 generates a data report 982 that indicates the relevant data 926.

At step 604, as a result of the first autonomous AI agent generating the data report, an assessment of the data report is received from a user. The assessment indicates a change to be made to the relevant data. In an example implementation, as a result of the first autonomous AI agent 912 generating the data report 982, the training logic 922 receives a report assessment 992, which assesses the data report 982, from a user. The report assessment 992 indicates a change to be made to the relevant data 926.

At step 606, the first autonomous AI agent is trained using the assessment. In an example implementation, the training logic 922 trains the first autonomous AI agent 912 using the report assessment 992.

In yet another example training embodiment, the method of flowchart 200 further includes one or more of the steps shown in flowchart 700 of FIG. 7. As shown in FIG. 7, the method of flowchart 700 begins at step 702. In step 702, a maliciousness report that indicates the maliciousness determination is generated by the second autonomous AI agent. In an example implementation, the second autonomous AI agent 914 generates a maliciousness report 984, which indicates the maliciousness determination 950.

At step 704, as a result of the second autonomous AI agent generating the maliciousness report, an assessment of the maliciousness report is received from a user. The assessment indicates a revised maliciousness determination, which differs from the maliciousness determination indicated by the maliciousness report. The revised maliciousness determination indicates whether the entity exhibits the malicious behavior. In an example implementation, as a result of the second autonomous AI agent 914 generating the maliciousness report 950, the training logic 922 receives a report assessment 992, which assesses the maliciousness report 984, from a user. The report assessment 992 indicates a revised maliciousness determination, which differs from the maliciousness determination 950 indicated by the maliciousness report 984. The revised maliciousness determination indicates whether the entity exhibits the malicious behavior.

At step 706, the second autonomous AI agent is trained using the assessment. In an example implementation, the training logic 922 trains the second autonomous AI agent 914 using the report assessment 992.

In still another example training embodiment, the method of flowchart 200 further includes one or more of the steps shown in flowchart 800 of FIG. 8. As shown in FIG. 8, the method of flowchart 800 begins at step 802. In step 802, a validity report that indicates the validity determination is generated by the third autonomous AI agent. In an example implementation, the third autonomous AI agent 916 generates a validity report 986, which indicates the validity determination 960.

At step 804, as a result of the third autonomous AI agent generating the validity report, an assessment of the validity report is received from a user. The assessment indicates a revised validity determination, which differs from the validity determination indicated by the validity report. The revised validity determination indicates whether the maliciousness determination is valid. In an example implementation, as a result of the third autonomous AI agent 916 generating the validity report 986, the training logic 922 receives a report assessment 992, which assesses the validity report 986, from a user. The report assessment 992 indicating a revised validity determination, which differs from the validity determination 960 indicated by the validity report 986. The revised validity determination indicates whether the maliciousness determination 950 is valid.

At step 806, the third autonomous AI agent is trained using the assessment. In an example implementation, the training logic 922 trains the third autonomous AI agent 916 using the report assessment 992.

In an example embodiment, the first, second, third, and fourth autonomous AI agents 912, 914, 916, and 918 cause (e.g., trigger) the AI model 924 to analyze (e.g., develop and/or refine an understanding of) the first, second, third, and fourth AI prompts 942, 944, 946, and 948 and the first, second, third, and fourth contextual information 952, 954, 956, and 958 (including any one or more of the relevant data 926, the potentially anomalous data description 928, the statistically anomalous data description 930, the maliciousness determination 950, the validity determination 960, and/or the overriding validity determination 970), relationships between any of the foregoing, and confidences in those relationships. For example, the first, second, third, and fourth autonomous AI agents 912, 914, 916, and 918 may cause the AI model 924 to compare attributes of the first, second, third, and fourth AI prompts 942, 944, 946, and 948, the first, second, third, and fourth contextual information 952, 954, 956, and 958 (including any one or more of the relevant data 926, the potentially anomalous data description 928, the statistically anomalous data description 930, the maliciousness determination 950, the validity determination 960, and/or the overriding validity determination 970), other contextual information (which may include sample AI prompt(s), sample relevant data, sample potentially anomalous data description(s), sample statistically anomalous data description(s), sample maliciousness determination(s), sample validity determination(s), and sample overriding validity determination(s)) using artificial intelligence to select the relevant data 926 from the corpus of data 940, to determine whether the entity exhibits malicious behavior, to determine whether the maliciousness determination 950 is valid, and to determine whether the validity determination 960 is to be overturned.

In some example embodiments, the AI model 924 includes a neural network that uses the artificial intelligence to determine (e.g., predict) relationships between the first, second, third, and fourth AI prompts 942, 944, 946, and 948, the first, second, third, and fourth contextual information 952, 954, 956, and 958 (including any one or more of the relevant data 926, the potentially anomalous data description 928, the statistically anomalous data description 930, the maliciousness determination 950, the validity determination 960, and/or the overriding validity determination 970), and confidences in the relationships. The neural network uses those relationships to select the relevant data 926 from the corpus of data 940, to determine whether the entity exhibits malicious behavior, to determine whether the maliciousness determination 950 is valid, and to determine whether the validity determination 960 is to be overturned. For example, attributes of the first, second, third, and fourth AI prompts 942, 944, 946, and 948 and potentially example AI prompt(s), example relevant data, example potentially anomalous data description(s), example statistically anomalous data description(s), example maliciousness determination(s), example validity determination(s), and example overriding validity determination(s) may be compared to determine similarities and differences between those attributes. In accordance with this example, the neural network may use those similarities and differences to select the relevant data 926 from the corpus of data 940, to determine whether the entity exhibits malicious behavior, to determine whether the maliciousness determination 950 is valid, and to determine whether the validity determination 960 is to be overturned.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, any one or more of the first, second, third, and fourth autonomous AI agents 912, 914, 916, and 918 employ a feed forward neural network to train the AI model 924, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a data relevancy model (e.g., to select relevant data from a corpus of data) by utilizing information, such as AI prompts (e.g., the first AI prompt 942), contextual information (e.g., the first contextual information 952), relationships between any of the foregoing, and AI-based confidences that are derived therefrom.

In another example embodiment, the transformer-based neural network generates a malicious behavior model (e.g., to determine whether entities exhibit malicious behavior) by utilizing information, such as AI prompts (e.g., the second AI prompt 944), contextual information (e.g., the second contextual information 954, including the relevant data 926), relationships between any of the foregoing, and AI-based confidences that are derived therefrom.

In yet another example embodiment, the transformer-based neural network generates a validity model (e.g., to determine whether maliciousness determinations are valid) by utilizing information, such as AI prompts (e.g., the third AI prompt 946), contextual information (e.g., the third contextual information 956, including the relevant data 926 and the maliciousness determination 950), relationships between any of the foregoing, and AI-based confidences that are derived therefrom.

In still another example embodiment, the transformer-based neural network generates a validity overturning model (e.g., to determine whether validity determinations are to be overturned) by utilizing information, such as AI prompts (e.g., the fourth AI prompt 948), contextual information (e.g., the fourth contextual information 958, including the relevant data 926, the maliciousness determination 950, and the validity determination 960), relationships between any of the foregoing, and AI-based confidences that are derived therefrom.

In example embodiments, the first, second, third, and fourth AI prompts 942, 944, 946, and 948 include training logic, and the AI model 924 includes inference logic. The training logic is configured to train an AI algorithm that the inference logic uses to determine (e.g., infer) the AI-based confidences. For instance, the training logic may provide sample AI prompt(s) and sample contextual information (e.g., sample relevant data, sample potentially anomalous data description(s), sample statistically anomalous data description(s), sample maliciousness determination(s), sample validity determination(s), and sample overriding validity determination(s)) as inputs to the AI algorithm to train the AI algorithm. The sample data may be labeled. The AI algorithm may be configured to derive relationships between the features (e.g., the first, second, third, and fourth AI prompts 942, 944, 946, and 948 and the first, second, third, and fourth contextual information 952, 954, 956, and 958) and the resulting AI-based confidences. The inference logic is configured to utilize the AI algorithm, which is trained by the training logic, to determine the AI-based confidence when the features are provided as inputs to the algorithm.

In an example embodiment, the AI model 924 includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMAR) model, developed and distributed by Meta Platforms Inc.; a language model for dialogue applications (a.k.a., LaMDA®) model and a Gemini® model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, the AI model 924 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model and the Gemini® model, developed and distributed by Google LLC.

In yet another example embodiment, the AI model 924 includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of data, such as a data point (e.g., a log or a portion thereof). In an aspect of this embodiment, the embedding model is an encoder-only model. One example of an encoder-only model is the bidirectional encoder representations from transformers (BERT™) model, which is developed and distributed by Google LLC. In another aspect of this embodiment, the embedding model is a decoder-only model. In yet another aspect of this embodiment, the embedding model is an encoder-decoder model. One example of an encoder-decoder model is the FLAN-T5™ model, which is developed and distributed by Google LLC.

In still another example embodiment, the AI model 924 includes multiple types of AI models. Weights may be applied to the responses generated by the respective types of AI models. For example, the AI model 924 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. The AI model 924 may combine (e.g., sum) the first weighted response and the second weighted response to generate a response of the AI model 924.

It will be recognized that the computing system 900 may not include one or more of the multi-agent maliciousness analysis logic 908, the store 910, the first autonomous AI agent 912, the second autonomous AI agent 914, the third autonomous AI agent 916, the fourth autonomous AI agent 918, the security action logic 920, the training logic 922, the AI model 924, the first AI tools 932, the second AI tools 934, the third AI tools 936, and/or the fourth AI tools 938. Furthermore, the computing system 900 may include components in addition to or in lieu of the multi-agent maliciousness analysis logic 908, the store 910, the first autonomous AI agent 912, the second autonomous AI agent 914, the third autonomous AI agent 916, the fourth autonomous AI agent 918, the security action logic 920, the training logic 922, the AI model 924, the first AI tools 932, the second AI tools 934, the third AI tools 936, and/or the fourth AI tools 938. For instance, the multi-agent maliciousness analysis logic 908 is shown to include four autonomous AI agents (namely, the first, second, third, and fourth autonomous AI agents 912, 914, 916, and 918) for non-limiting, illustrative purposes. It will be recognized that the multi-agent maliciousness analysis logic 908 may include any suitable number, N, of autonomous AI agents, where N is a positive integer that is greater than or equal to 2. For example, N may be 2, 3, 4, 5, 10, or 25.

Figure 10:
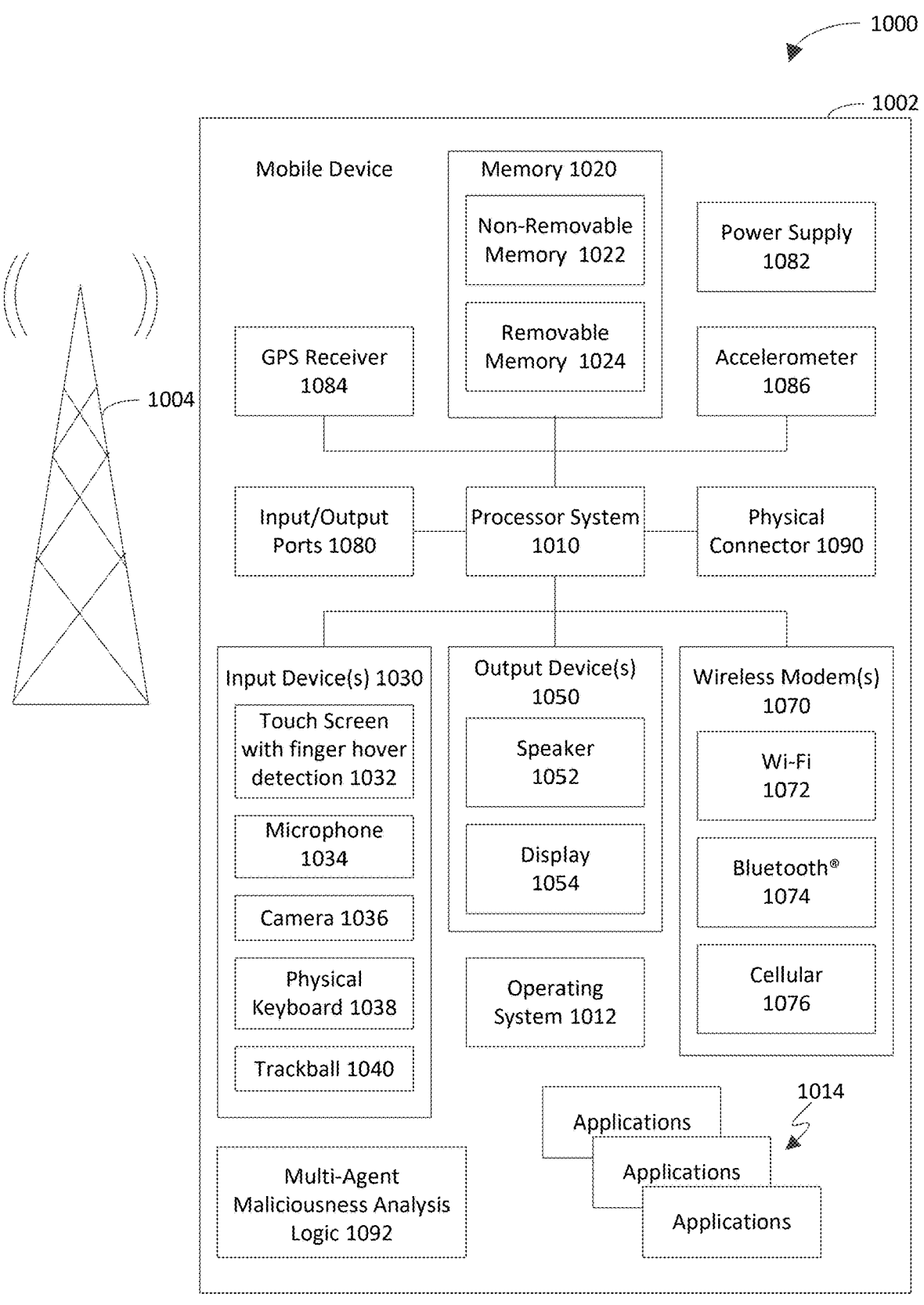
FIG. 10 is a system diagram of an example mobile device in accordance with an embodiment.

FIG. 10 is a system diagram of an example mobile device 1000 including a variety of optional hardware and software components, shown generally as 1002. Any components 1002 in the mobile device may communicate with any other component, though not all connections are shown, for ease of illustration. The mobile device 1000 may be any of a variety of computing devices (e.g., cell phone, smartphone, handheld computer, Personal Digital Assistant (PDA), etc.) and may allow wireless two-way communications with one or more mobile communications networks 1004, such as a cellular or satellite network, or with a local area or wide area network.

The mobile device 1000 includes a processor system 1010 (e.g., signal processor, microprocessor, ASIC, or other control and processing logic circuitry) for performing such tasks as signal coding, data processing, input/output processing, power control, and/or other functions. An operating system 1012 may control the allocation and usage of the components 1002 and support for one or more applications 1014 (a.k.a. application programs). The applications 1014 may include common mobile computing applications (e.g., email applications, calendars, contact managers, web browsers, messaging applications) and any other computing applications (e.g., word processing applications, mapping applications, media player applications).

The mobile device 1000 includes multi-agent maliciousness analysis logic 1092, which is operable in a manner similar to the multi-agent maliciousness analysis logic 108 described above with reference to FIG. 1 and/or the multi-agent maliciousness analysis logic 908 described above with reference to FIG. 9.

The mobile device 1000 includes memory 1020. The memory 1020 may include non-removable memory 1022 and/or removable memory 1024. The non-removable memory 1022 may include random access memory (RAM), read-only memory (ROM), flash memory, a hard disk, or other well-known memory storage technologies. The removable memory 1024 may include flash memory or a Subscriber Identity Module (SIM) card, which is well known in Global System for Mobile Communications (GSM) systems, or other well-known memory storage technologies, such as "smart cards." The memory 1020 may store data and/or code for running the operating system 1012 and the applications 1014. Example data may include web pages, text, images, sound files, video data, or other data sets to be sent to and/or received from one or more network servers or other devices via one or more wired or wireless networks. Memory 1020 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1000 may support one or more input devices 1030, such as a touch screen 1032, microphone 1034, camera 1036, physical keyboard 1038 and/or trackball 1040 and one or more output devices 1050, such as a speaker 1052 and a display 1054. Touch screens, such as the touch screen 1032, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1032 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 1032 and display 1054 may be combined in a single input/output device. The input devices 1030 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 may include speech-recognition software as part of a voice control interface that allows a user to operate the mobile device 1000 via voice commands. Furthermore, the mobile device 1000 may include input devices and software that allows for user interaction via a user's spatial gestures, such as detecting and interpreting gestures to provide input to a gaming application.

Wireless modem(s) 1070 may be coupled to antenna(s) (not shown) and may support two-way communications between the processor system 1010 and external devices, as is well understood in the art. The modem(s) 1070 are shown generically and may include a cellular modem 1076 for communicating with the mobile communication network 1004 and/or other radio-based modems (e.g., Bluetooth® 1074 and/or Wi-Fi 1072). At least one of the wireless modem(s) 1070 is typically configured for communication with one or more cellular networks, such as a GSM network for data and voice communications within a single cellular network, between cellular networks, or between the mobile device and a public switched telephone network (PSTN).

The mobile device 1000 may further include at least one input/output port 1080, a power supply 1082, a satellite navigation system receiver 1084, such as a Global Positioning System (GPS) receiver, an accelerometer 1086, and/or a physical connector 1090, which may be a universal serial bus (USB) port, IEEE 1394 (Fire Wire) port, and/or RS-232 port. The illustrated components 1002 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the multi-agent maliciousness analysis logic 108, the multi-agent maliciousness analysis logic 908, the first autonomous AI agent 912, the second autonomous AI agent 914, the third autonomous AI agent 916, the fourth autonomous AI agent 918, the security action logic 920, the training logic 922, the AI model 924, the first AI tools 932, the second AI tools 934, the third AI tools 936, the fourth AI tools 938, flowchart 200, flowchart 300, flowchart 400, flowchart 500, flowchart 600, flowchart 700, and/or flowchart 800 may be implemented in hardware, software, firmware, or any combination thereof.

For example, any one or more of the multi-agent maliciousness analysis logic 108, the multi-agent maliciousness analysis logic 908, the first autonomous AI agent 912, the second autonomous AI agent 914, the third autonomous AI agent 916, the fourth autonomous AI agent 918, the security action logic 920, the training logic 922, the AI model 924, the first AI tools 932, the second AI tools 934, the third AI tools 936, the fourth AI tools 938, flowchart 200, flowchart 300, flowchart 400, flowchart 500, flowchart 600, flowchart 700, and/or flowchart 800 may be implemented, at least in part, as computer program code configured to be executed in one or more processors.

In another example, any one or more of the multi-agent maliciousness analysis logic 108, the multi-agent maliciousness analysis logic 908, the first autonomous AI agent 912, the second autonomous AI agent 914, the third autonomous AI agent 916, the fourth autonomous AI agent 918, the security action logic 920, the training logic 922, the AI model 924, the first AI tools 932, the second AI tools 934, the third AI tools 936, the fourth AI tools 938, flowchart 200, flowchart 300, flowchart 400, flowchart 500, flowchart 600, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
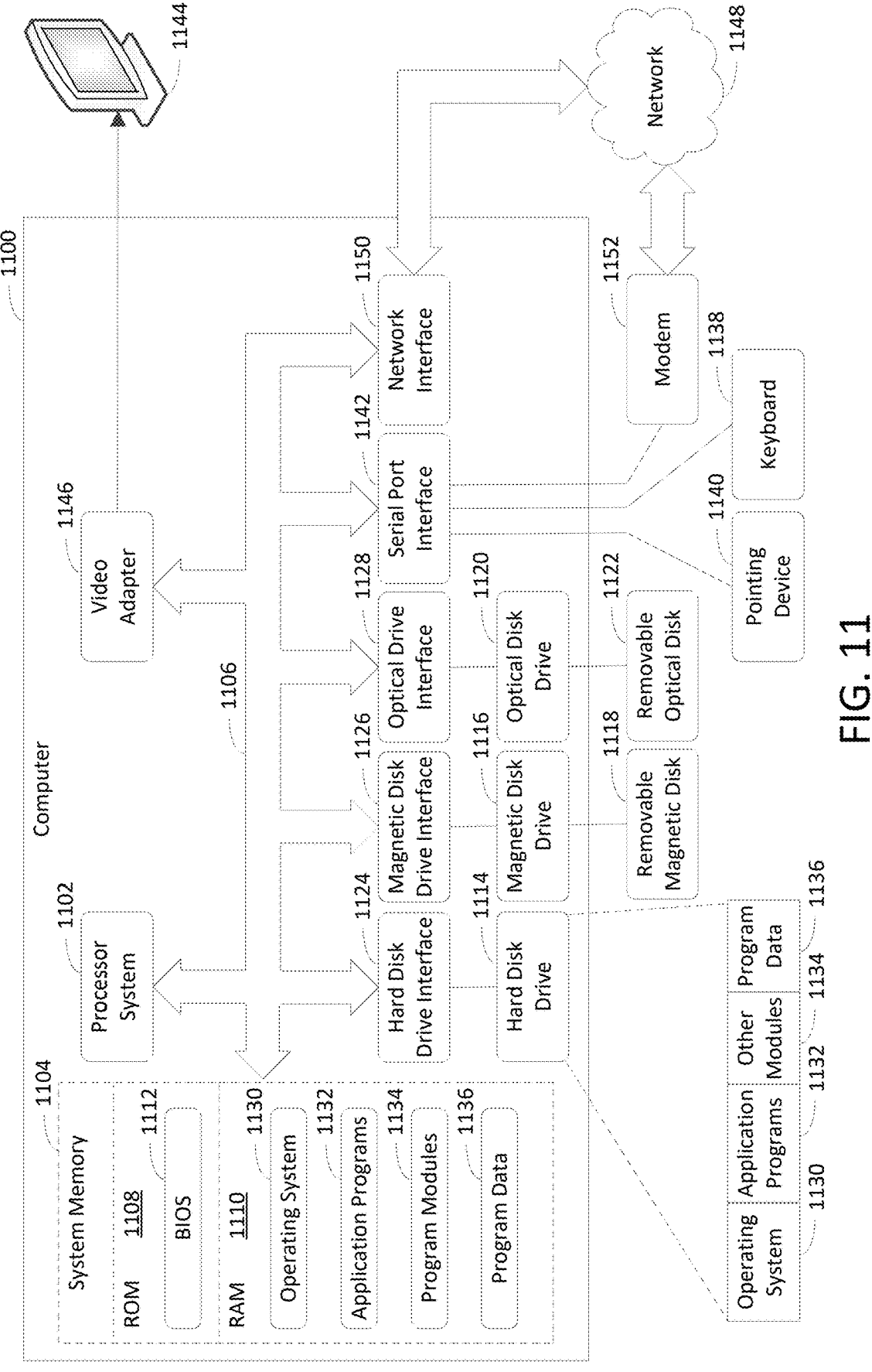
FIG. 11 depicts an example computer in which embodiments may be implemented.

II. Further Discussion of Some Example Embodiments (A1) An example system (FIG. 1, 102A-102M, 106A-106N; FIG. 9, 900; FIG. 10, 1002; FIG. 11, 1100) comprises a processor system (FIG. 10, 1010; FIG. 11, 1102) and a memory (FIG. 10, 1020, 1022, 1024; FIG. 11, 1104, 1108, 1110) that stores computer-executable instructions. The computer-executable instructions are executable by the processor system to at least execute a first autonomous artificial intelligence (AI) agent (FIG. 9, 912) that, in response to receiving an inquiry (FIG. 9, 972) that asks whether an entity exhibits malicious behavior, selects (FIG. 2, 202) relevant data (FIG. 9, 926) from a corpus of data (FIG. 9, 940) using a first selected AI tool as a result of the relevant data being associated with the entity. The first selected AI tool is selected by the first autonomous AI agent from a plurality of first AI tools (FIG. 9, 932) in an AI model (FIG. 9, 924) that are available to the first autonomous AI agent. The computer-executable instructions are executable by the processor system further to at least execute a second autonomous AI agent (FIG. 9, 914) that, in response to receiving the relevant data from the first autonomous AI agent, generates (FIG. 2, 204) a maliciousness determination (FIG. 9, 950) by analyzing the relevant data using a second selected AI tool. The maliciousness determination indicates whether the entity exhibits the malicious behavior. The second selected AI tool is selected by the second autonomous AI agent from a plurality of second AI tools (FIG. 9, 934) in the AI model that are available to the second autonomous AI agent. The computer-executable instructions are executable by the processor system further to at least execute a third autonomous AI agent (FIG. 9, 916) that generates (FIG. 2, 206) a validity determination (FIG. 9, 960) by analyzing the maliciousness determination using a third selected AI tool. The validity determination indicates whether the maliciousness determination is valid. The third selected AI tool is selected by the third autonomous AI agent from a plurality of third AI tools (FIG. 9, 936) in the AI model that are available to the third autonomous AI agent. The computer-executable instructions are executable by the processor system further to at least, as a result of an analysis that takes into consideration the validity determination, trigger (FIG. 2, 208) execution of an instruction that causes a security action (FIG. 9, 990) to be performed with regard to the entity.

(A2) In the example system of A1, wherein the computer-executable instructions are executable by the processor system to at least: trigger the execution of the instruction that causes access of a user to the entity to be blocked.

(A3) In the example system of any of A1-A2, wherein the computer-executable instructions are executable by the processor system to at least: trigger the execution of the instruction that causes a statement to be provided via a user interface, the statement indicating whether the entity exhibits malicious behavior.

(A4) In the example system of any of A1-A3, wherein the first autonomous AI agent triggers the first selected AI tool to select the relevant data from the corpus of data by providing a first AI prompt, which identifies the corpus of data, as an input to the first selected AI tool, the first AI prompt requesting selection of data that is associated with the entity from the corpus of data; wherein the second autonomous AI agent triggers the second selected AI tool to determine whether the entity exhibits the malicious behavior by providing a second AI prompt together with designated contextual information as inputs to the second selected AI tool, the second AI prompt requesting a determination whether the entity exhibits the malicious behavior, wherein the designated contextual information comprises the relevant data, and wherein the designated contextual information comprises context regarding the second AI prompt; and wherein the third autonomous AI agent triggers the third selected AI tool to determine whether the maliciousness determination is valid by providing a third AI prompt together with specified contextual information as inputs to the third selected AI tool, the third AI prompt requesting a determination whether the maliciousness determination is valid, wherein the specified contextual information comprises the relevant data and the maliciousness determination, and wherein the specified contextual information comprises context regarding the third AI prompt.

(A5) In the example system of any of A1-A4, wherein the first autonomous AI agent selects first relevant data from the corpus of data using a sampling tool as a result of a first embedding that represents the first relevant data corresponding to a center of a plurality of embeddings that represent the corpus of data, wherein the sampling tool is selected by the first autonomous AI agent from the plurality of first AI tools in the AI model that are available to the first autonomous AI agent; and wherein the first autonomous AI agent selects second relevant data from the corpus of data using the sampling tool as a result of a distance between a second embedding that represents the second relevant data and the first embedding being greater than distances between others of the plurality of embeddings and the first embedding.

(A6) In the example system of any of A1-A5, wherein the first autonomous AI agent selects third relevant data from the corpus of data using the sampling tool as a result of a first distance or a second distance, whichever is less, being greater than third distances or fourth distances, whichever are less; wherein the first distance is between a third embedding that represents the third relevant data and the first embedding; wherein the second distance is between the third embedding and the second embedding; wherein the third distances are between others of the plurality of embeddings and the first embedding; and wherein the fourth distances are between the others of the plurality of embeddings and the second embedding.

(A7) In the example system of any of A1-A6, wherein the first autonomous AI agent selects the first relevant data from the corpus of data using the sampling tool as a result of the embedding that represents the first relevant data corresponding to an average of the plurality of embeddings.

(A8) In the example system of any of A1-A7, wherein the first autonomous AI agent selects the first relevant data from the corpus of data using the sampling tool as a result of the embedding that represents the first relevant data corresponding to a median of the plurality of embeddings.

(A9) In the example system of any of A1-A8, wherein the first autonomous AI agent clusters subsets of the corpus of data into respective clusters using a clustering tool by analyzing a plurality of embeddings that represent the corpus of data using the clustering tool as a result of the subsets corresponding to respective attributes, wherein the clustering tool is selected by the first autonomous AI agent from the plurality of first AI tools in the AI model that are available to the first autonomous AI agent; and wherein the first autonomous AI agent selects the relevant data from the respective clusters using the first selected AI tool.

(A10) In the example system of any of A1-A9, wherein the first autonomous AI agent selects the relevant data from the corpus of data using the first selected AI tool as a result of the relevant data pertaining to security of the entity.

(A11) In the example system of any of A1-A10, wherein, in response to receiving the inquiry that asks whether the entity exhibits the malicious behavior, the first autonomous AI agent identifies potentially anomalous data in at least a portion of the corpus of data using an anomaly detection tool as a result of differences between embeddings of the potentially anomalous data and a reference embedding that corresponds to at least the portion of the corpus of data being greater than differences between embeddings of other data in at least the portion of the corpus of data and the reference embedding, wherein the anomaly detection tool is selected by the first autonomous AI agent from the plurality of first AI tools in the AI model that are available to the first autonomous AI agent; and wherein the third autonomous AI agent generates the validity determination by analyzing the maliciousness determination and a description of the potentially anomalous data using the third selected AI tool.

(A12) In the example system of any of A1-A11, wherein, in response to receiving the inquiry that asks whether the entity exhibits the malicious behavior, the first autonomous AI agent identifies the potentially anomalous data in at least the portion of the corpus of data using an isolation forest tool that performs an isolation forest anomaly detection technique on at least the portion of the corpus of data, wherein the isolation forest tool is selected by the first autonomous AI agent from the plurality of first AI tools in the AI model that are available to the first autonomous AI agent.

(A13) In the example system of any of A1-A12, wherein, in response to receiving the inquiry that asks whether the entity exhibits the malicious behavior, the first autonomous AI agent identifies statistically anomalous data in the relevant data using an anomaly detection tool as a result of events indicated by embeddings of the statistically anomalous data occurring more than an expected number of times during a period of time, wherein the anomaly detection tool is selected by the first autonomous AI agent from the plurality of first AI tools in the AI model that are available to the first autonomous AI agent; and wherein the third autonomous AI agent generates the validity determination by analyzing the maliciousness determination and a description of the statistically anomalous data using the third selected AI tool.

(A14) In the example system of any of A1-A13, wherein, in response to receiving the inquiry that asks whether the entity exhibits the malicious behavior, the first autonomous AI agent identifies the statistically anomalous data in the relevant data using a frequency analysis tool that performs a frequency analysis technique on the relevant data, wherein the frequency analysis tool is selected by the first autonomous AI agent from the plurality of first AI tools in the AI model that are available to the first autonomous AI agent.

(A15) In the example system of any of A1-A14, wherein, in response to receiving the inquiry that asks whether the entity exhibits the malicious behavior, the first autonomous AI agent identifies the statistically anomalous data in the relevant data using a p-value analysis tool that performs a p-value analysis technique on the relevant data, wherein the p-value analysis tool is selected by the first autonomous AI agent from the plurality of first AI tools in the AI model that are available to the first autonomous AI agent.

(A16) In the example system of any of A1-A15, wherein the computer-executable instructions are executable by the processor system further to at least: train the second selected AI tool using the validity determination.

(A17) In the example system of any of A1-A16, wherein the validity determination indicates that the maliciousness determination is invalid; wherein the computer-executable instructions are executable by the processor system to at least: execute a fourth autonomous AI agent that generates an overriding validity determination by performing the analysis of the maliciousness determination and the validity determination using a fourth selected AI tool, wherein the overriding validity determination indicates whether the validity determination that is generated by the third autonomous AI agent is to be overturned, and wherein the fourth selected AI tool is selected by the fourth autonomous AI agent from a plurality of fourth AI tools in the AI model that are available to the fourth autonomous AI agent; and perform the security action using the overriding validity determination.

(A18) In the example system of any of A1-A17, wherein the fourth autonomous AI agent triggers the fourth selected AI tool to determine whether the validity determination that is generated by the third autonomous AI agent is to be overturned by providing an AI prompt together with contextual information as inputs to the fourth selected AI tool, wherein the AI prompt requests a determination whether the validity determination that is generated by the third autonomous AI agent is to be overturned, wherein the contextual information comprises the relevant data, the maliciousness determination, and the validity determination, and wherein the contextual information comprises context regarding the AI prompt.

(A19) In the example system of any of A1-A18, wherein the computer-executable instructions are executable by the processor system further to at least: trigger the fourth autonomous AI agent to generate the overriding validity determination by providing an AI prompt and contextual information as inputs to the fourth autonomous AI agent, wherein the AI prompt specifies that a purpose of the fourth autonomous AI agent is to determine whether the validity determination is to be overturned, wherein the contextual information comprises the relevant data, the maliciousness determination, and the validity determination, and wherein the contextual information comprises context regarding the AI prompt.

(A20) In the example system of any of A1-A19, wherein the fourth autonomous AI agent generates a mediation report that indicates the overriding maliciousness determination; and wherein the computer-executable instructions are executable by the processor system further to at least: as a result of the fourth autonomous AI agent generating the mediation report, receive an assessment of the mediation report from a user, the assessment indicating a recommended change to be incorporated into the analysis performed by the fourth autonomous AI agent using the fourth selected AI tool; and train the fourth autonomous AI agent using the assessment.

(A21) In the example system of any of A1-A20, wherein the computer-executable instructions are executable by the processor system further to at least: trigger the first autonomous AI agent to select the relevant data from the corpus of data by providing an AI prompt, which identifies the corpus of data, as an input to the first autonomous AI agent, the AI prompt specifying that a purpose of the first autonomous AI agent is to select the relevant data from the corpus of data.

(A22) In the example system of any of A1-A21, wherein the computer-executable instructions are executable by the processor system further to at least: trigger the second autonomous AI agent to generate the maliciousness determination by providing an AI prompt together with contextual information as inputs to the second autonomous AI agent, wherein the AI prompt specifies that a purpose of the second autonomous AI agent is to determine whether the entity exhibits the malicious behavior, wherein the contextual information comprises the relevant data, and wherein the contextual information comprises context regarding the AI prompt.

(A23) In the example system of any of A1-A22, wherein the computer-executable instructions are executable by the processor system further to at least: trigger the third autonomous AI agent to generate the validity determination by providing an AI prompt together with contextual information as inputs to the third autonomous AI agent, wherein the AI prompt specifies that a purpose of the third autonomous AI agent is to determine whether the maliciousness determination is valid, wherein the contextual information comprises the relevant data and the maliciousness determination, and wherein the contextual information comprises context regarding the AI prompt.

(A24) In the example system of any of A1-A23, wherein the first autonomous AI agent generates a data report that indicates the relevant data; and wherein the computer-executable instructions are executable by the processor system further to at least: as a result of the first autonomous AI agent generating the data report, receive an assessment of the data report from a user, the assessment indicating a change to be made to the relevant data; and train the first autonomous AI agent using the assessment.

(A25) In the example system of any of A1-A24, wherein the second autonomous AI agent generates a maliciousness report that indicates the maliciousness determination; and wherein the computer-executable instructions are executable by the processor system further to at least: as a result of the second autonomous AI agent generating the maliciousness report, receive an assessment of the maliciousness report from a user, the assessment indicating a revised maliciousness determination, which differs from the maliciousness determination indicated by the maliciousness report, the revised maliciousness determination indicating whether the entity exhibits the malicious behavior; and train the second autonomous AI agent using the assessment.

(A26) In the example system of any of A1-A25, wherein the third autonomous AI agent generates a validity report that indicates the validity determination; and wherein the computer-executable instructions are executable by the processor system further to at least: as a result of the third autonomous AI agent generating the validity report, receive an assessment of the validity report from a user, the assessment indicating a revised validity determination, which differs from the validity determination indicated by the validity report, the revised validity determination indicating whether the maliciousness determination is valid; and train the third autonomous AI agent using the assessment.

(B1) An example method is implemented by a computing system (FIG. 1, 102A-102M, 106A-106N; FIG. 9, 900; FIG. 10, 1002; FIG. 11, 1100). The method comprises, in response to receiving an inquiry (FIG. 9, 972) that asks whether an entity exhibits malicious behavior, selecting (FIG. 2, 202), by a first autonomous artificial intelligence (AI) agent (FIG. 9, 912), relevant data (FIG. 9, 926) from a corpus of data (FIG. 9, 940) using a first selected AI tool, which is selected by the first autonomous AI agent from a plurality of first AI tools (FIG. 9, 932) in an AI model (FIG. 9, 924) that are available to the first autonomous AI agent, as a result of the relevant data being associated with the entity. The method further comprises, in response to receiving the relevant data from the first autonomous AI agent, generating (FIG. 2, 204), by a second autonomous AI agent (FIG. 9, 914), a maliciousness determination (FIG. 9, 950), which indicates whether the entity exhibits the malicious behavior, by analyzing the relevant data using a second selected AI tool, which is selected by the second autonomous AI agent from a plurality of second AI tools (FIG. 9, 934) in the AI model that are available to the second autonomous AI agent. The method further comprises generating (FIG. 2, 206), by a third autonomous AI agent (FIG. 9, 916), a validity determination (FIG. 9, 960), which indicates whether the maliciousness determination is valid, by analyzing the maliciousness determination using a third selected AI tool, which is selected by the third autonomous AI agent from a plurality of third AI tools (FIG. 9, 936) in the AI model that are available to the third autonomous AI agent. The method further comprises, as a result of an analysis that takes into consideration the validity determination, triggering (FIG. 2, 208) execution of an instruction that causes a security action (FIG. 9, 990) to be performed with regard to the entity.

(B2) In the example method of B1, wherein triggering execution of the instruction that causes the security action to be performed with regard to the entity comprises: triggering execution of the instruction that causes access of a user to the entity to be blocked.

(B3) In the example method of any of B1-B2, wherein triggering execution of the instruction that causes the security action to be performed with regard to the entity comprises: triggering execution of the instruction that causes a statement to be provided via a user interface, the statement indicating whether the entity exhibits malicious behavior.

(B4) In the example method of any of B1-B3, wherein selecting the relevant data from the corpus of data comprises: triggering, by the first autonomous AI agent, the first selected AI tool to select the relevant data from the corpus of data by providing a first AI prompt, which identifies the corpus of data, as an input to the first selected AI tool, the first AI prompt requesting selection of data that is associated with the entity from the corpus of data; wherein generating the maliciousness determination comprises: triggering, by the second autonomous AI agent, the second selected AI tool to determine whether the entity exhibits the malicious behavior by providing a second AI prompt together with designated contextual information as inputs to the second selected AI tool, the second AI prompt requesting a determination whether the entity exhibits the malicious behavior, wherein the designated contextual information comprises the relevant data, and wherein the designated contextual information comprises context regarding the second AI prompt; and wherein generating the validity determination comprises: triggering, by the third autonomous AI agent, the third selected AI tool to determine whether the maliciousness determination is valid by providing a third AI prompt together with specified contextual information as inputs to the third selected AI tool, the third AI prompt requesting a determination whether the maliciousness determination is valid, wherein the specified contextual information comprises the relevant data and the maliciousness determination, and wherein the specified contextual information comprises context regarding the third AI prompt.

(B5) In the example method of any of B1-B4, wherein selecting the relevant data from the corpus of data comprises: selecting, by the first autonomous AI agent, first relevant data from the corpus of data using a sampling tool, which is selected by the first autonomous AI agent from the plurality of first AI tools in the AI model that are available to the first autonomous AI agent, as a result of a first embedding that represents the first relevant data corresponding to a center of a plurality of embeddings that represent the corpus of data; and selecting, by the first autonomous AI agent, second relevant data from the corpus of data using the sampling tool as a result of a distance between a second embedding that represents the second relevant data and the first embedding being greater than distances between others of the plurality of embeddings and the first embedding.

(B6) In the example method of any of B1-B5, wherein selecting the relevant data from the corpus of data further comprises: selecting, by the first autonomous AI agent, third relevant data from the corpus of data using the sampling tool as a result of a first distance or a second distance, whichever is less, being greater than third distances or fourth distances, whichever are less; wherein the first distance is between a third embedding that represents the third relevant data and the first embedding; wherein the second distance is between the third embedding and the second embedding; wherein the third distances are between others of the plurality of embeddings and the first embedding; and wherein the fourth distances are between the others of the plurality of embeddings and the second embedding.

(B7) In the example method of any of B1-B6, wherein selecting the first relevant data comprises: selecting, by the first autonomous AI agent, the first relevant data from the corpus of data using the sampling tool as a result of the embedding that represents the first relevant data corresponding to an average of the plurality of embeddings.

(B8) In the example method of any of B1-B7, wherein selecting the first relevant data comprises: selecting, by the first autonomous AI agent, the first relevant data from the corpus of data using the sampling tool as a result of the embedding that represents the first relevant data corresponding to a median of the plurality of embeddings.

(B9) In the example method of any of B1-B8, wherein selecting the relevant data from the corpus of data comprises: clustering, by the first autonomous AI agent, subsets of the corpus of data into respective clusters using a clustering tool, which is selected by the first autonomous AI agent from the plurality of first AI tools in the AI model that are available to the first autonomous AI agent, by analyzing a plurality of embeddings that represent the corpus of data using the clustering tool as a result of the subsets corresponding to respective attributes; and selecting, by the first autonomous AI agent, the relevant data from the respective clusters using the first selected AI tool.

(B10) In the example method of any of B1-B9, wherein selecting the relevant data from the corpus of data comprises: selecting, by the first autonomous AI agent, the relevant data from the corpus of data using the first selected AI tool as a result of the relevant data pertaining to security of the entity.

(B11) In the example method of any of B1-B10, further comprising: in response to receiving the inquiry that asks whether the entity exhibits the malicious behavior, identifying, by the first autonomous AI agent, potentially anomalous data in at least a portion of the corpus of data using an anomaly detection tool, which is selected by the first autonomous AI agent from the plurality of first AI tools in the AI model that are available to the first autonomous AI agent, as a result of differences between embeddings of the potentially anomalous data and a reference embedding that corresponds to at least the portion of the corpus of data being greater than differences between embeddings of other data in at least the portion of the corpus of data and the reference embedding; wherein generating the validity determination comprises: generating, by the third autonomous AI agent, the validity determination by analyzing the maliciousness determination and a description of the potentially anomalous data using the third selected AI tool.

(B12) In the example method of any of B1-B11, wherein identifying the potentially anomalous data comprises: in response to receiving the inquiry that asks whether the entity exhibits the malicious behavior, identifying, by the first autonomous AI agent, the potentially anomalous data in at least the portion of the corpus of data using an isolation forest tool that performs an isolation forest anomaly detection technique on at least the portion of the corpus of data, wherein the isolation forest tool is selected by the first autonomous AI agent from the plurality of first AI tools in the AI model that are available to the first autonomous AI agent.

(B13) In the example method of any of B1-B12, further comprising: in response to receiving the inquiry that asks whether the entity exhibits the malicious behavior, identifying, by the first autonomous AI agent, statistically anomalous data in the relevant data using an anomaly detection tool, which is selected by the first autonomous AI agent from the plurality of first AI tools in the AI model that are available to the first autonomous AI agent, as a result of events indicated by embeddings of the statistically anomalous data occurring more than an expected number of times during a period of time; wherein generating the validity determination comprises: generating, by the third autonomous AI agent, the validity determination by analyzing the maliciousness determination and a description of the statistically anomalous data using the third selected AI tool.

(B14) In the example method of any of B1-B13, wherein identifying the statistically anomalous data comprises: in response to receiving the inquiry that asks whether the entity exhibits the malicious behavior, identifying, by the first autonomous AI agent, the statistically anomalous data in the relevant data using a frequency analysis tool that performs a frequency analysis technique on the relevant data, wherein the frequency analysis tool is selected by the first autonomous AI agent from the plurality of first AI tools in the AI model that are available to the first autonomous AI agent.

(B15) In the example method of any of B1-B14, wherein identifying the statistically anomalous data comprises: in response to receiving the inquiry that asks whether the entity exhibits the malicious behavior, identifying, by the first autonomous AI agent, the statistically anomalous data in the relevant data using a p-value analysis tool that performs a p-value analysis technique on the relevant data, wherein the p-value analysis tool is selected by the first autonomous AI agent from the plurality of first AI tools in the AI model that are available to the first autonomous AI agent.

(B16) In the example method of any of B1-B15, wherein the method further comprises: training the second selected AI tool using the validity determination.

(B17) In the example method of any of B1-B16, wherein the validity determination indicates that the maliciousness determination is invalid; wherein the method further comprises: generating, by a fourth autonomous AI agent, an overriding validity determination, which indicates whether the validity determination that is generated by the third autonomous AI agent is to be overturned, by performing the analysis of the maliciousness determination and the validity determination using a fourth selected AI tool, which is selected by the fourth autonomous AI agent from a plurality of fourth AI tools in the AI model that are available to the fourth autonomous AI agent; and wherein performing the security action comprises: performing the security action using the overriding validity determination.

(B18) In the example method of any of B1-B17, wherein generating the overriding validity determination comprises: triggering, by the fourth autonomous AI agent, the fourth selected AI tool to determine whether the validity determination that is generated by the third autonomous AI agent is to be overturned by providing an AI prompt together with contextual information as inputs to the fourth selected AI tool, the AI prompt requesting a determination whether the validity determination that is generated by the third autonomous AI agent is to be overturned, wherein the contextual information comprises the relevant data, the maliciousness determination, and the validity determination, and wherein the contextual information comprises context regarding the AI prompt.

(B19) In the example method of any of B1-B18, further comprising: triggering the fourth autonomous AI agent to generate the overriding validity determination by providing an AI prompt and contextual information as inputs to the fourth autonomous AI agent, wherein the AI prompt specifies that a purpose of the fourth autonomous AI agent is to determine whether the validity determination is to be overturned, wherein the contextual information comprises the relevant data, the maliciousness determination, and the validity determination, and wherein the contextual information comprises context regarding the AI prompt.

(B20) In the example method of any of B1-B19, further comprising: generating, by the fourth autonomous AI agent, a mediation report that indicates the overriding maliciousness determination; as a result of the fourth autonomous AI agent generating the mediation report, receiving an assessment of the mediation report from a user, the assessment indicating a recommended change to be incorporated into the analysis performed by the fourth autonomous AI agent using the fourth selected AI tool; and training the fourth autonomous AI agent using the assessment.

(B21) In the example method of any of B1-B20, further comprising: triggering the first autonomous AI agent to select the relevant data from the corpus of data by providing an AI prompt, which identifies the corpus of data, as an input to the first autonomous AI agent, the AI prompt specifying that a purpose of the first autonomous AI agent is to select the relevant data from the corpus of data.

(B22) In the example method of any of B1-B21, further comprising: triggering the second autonomous AI agent to generate the maliciousness determination by providing an AI prompt together with contextual information as inputs to the second autonomous AI agent, wherein the AI prompt specifies that a purpose of the second autonomous AI agent is to determine whether the entity exhibits the malicious behavior, wherein the contextual information comprises the relevant data, and wherein the contextual information comprises context regarding the AI prompt.

(B23) In the example method of any of B1-B22, further comprising: triggering the third autonomous AI agent to generate the validity determination by providing an AI prompt together with contextual information as inputs to the third autonomous AI agent, wherein the AI prompt specifies that a purpose of the third autonomous AI agent is to determine whether the maliciousness determination is valid, wherein the contextual information comprises the relevant data and the maliciousness determination, and wherein the contextual information comprises context regarding the AI prompt.

(B24) In the example method of any of B1-B23, further comprising: generating, by the first autonomous AI agent, a data report that indicates the relevant data; as a result of the first autonomous AI agent generating the data report, receiving an assessment of the data report from a user, the assessment indicating a change to be made to the relevant data; and training the first autonomous AI agent using the assessment.

(B25) In the example method of any of B1-B24, further comprising: generating, by the second autonomous AI agent, a maliciousness report that indicates the maliciousness determination; as a result of the second autonomous AI agent generating the maliciousness report, receiving an assessment of the maliciousness report from a user, the assessment indicating a revised maliciousness determination, which differs from the maliciousness determination indicated by the maliciousness report, the revised maliciousness determination indicating whether the entity exhibits the malicious behavior; and training the second autonomous AI agent using the assessment.

(B26) In the example method of any of B1-B25, further comprising: generating, by the third autonomous AI agent, a validity report that indicates the validity determination; as a result of the third autonomous AI agent generating the validity report, receiving an assessment of the validity report from a user, the assessment indicating a revised validity determination, which differs from the validity determination indicated by the validity report, the revised validity determination indicating whether the maliciousness determination is valid; and training the third autonomous AI agent using the assessment.

(C1) An example computer program product (FIG. 10, 1024; FIG. 11, 1118, 1122) comprises a computer-readable storage medium having instructions recorded thereon for enabling a processor-based system (FIG. 1, 102A-102M, 106A-106N; FIG. 9, 900; FIG. 10, 1002; FIG. 11, 1100) to perform operations. The operations comprise executing a first autonomous artificial intelligence (AI) agent (FIG. 9, 912) that, in response to receiving an inquiry (FIG. 9, 972) that asks whether an entity exhibits malicious behavior, selects (FIG. 2, 202) relevant logs (FIG. 9, 926) from a plurality of logs (FIG. 9, 940) using a first selected AI tool as a result of the relevant logs being associated with the entity. The first selected AI tool is selected by the first autonomous AI agent from a plurality of first AI tools (FIG. 9, 932) in an AI model (FIG. 9, 924) that are available to the first autonomous AI agent. The operations further comprise executing a second autonomous AI agent (FIG. 9, 914) that, in response to receiving the relevant logs from the first autonomous AI agent, generates (FIG. 2, 204) a maliciousness determination (FIG. 9, 950) by analyzing the relevant logs using a second selected AI tool. The maliciousness determination indicates whether the entity exhibits the malicious behavior. The second selected AI tool is selected by the second autonomous AI agent from a plurality of second AI tools (FIG. 9, 934) in the AI model that are available to the second autonomous AI agent. The operations further comprise executing a third autonomous AI agent (FIG. 9, 916) that generates (FIG. 2, 206) a validity determination (FIG. 9, 960) by analyzing the maliciousness determination using a third selected AI tool. The validity determination indicates whether the maliciousness determination is valid. The third selected AI tool is selected by the third autonomous AI agent from a plurality of third AI tools (FIG. 9, 936) in the AI model that are available to the third autonomous AI agent. The operations further comprise, as a result of an analysis that takes into consideration the validity determination, triggering (FIG. 2, 208) execution of an instruction that causes a statement to be provided via a user interface. The statement indicates whether the entity exhibits malicious behavior.

III. Example Computer System

FIG. 11 depicts an example computer 1100 in which embodiments may be implemented. Any one or more of the user devices 102A-102M and/or any one or more of the servers 106A-106N shown in FIG. 1 and/or the computing system 900 shown in FIG. 9 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processor system 1102, a system memory 1104, and a bus 1106 that couples various system components including system memory 1104 to processor system 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of (e.g., at least a portion of) the multi-agent maliciousness analysis logic 108, the multi-agent maliciousness analysis logic 908, the first autonomous AI agent 912, the second autonomous AI agent 914, the third autonomous AI agent 916, the fourth autonomous AI agent 918, the security action logic 920, the training logic 922, the AI model 924, the first AI tools 932, the second AI tools 934, the third AI tools 936, the fourth AI tools 938, flowchart 200 (including any step of flowchart 200), flowchart 300 (including any step of flowchart 300), flowchart 400 (including any step of flowchart 400), flowchart 500 (including any step of flowchart 500), flowchart 600 (including any step of flowchart 600), flowchart 700 (including any step of flowchart 700), and/or flowchart 800 (including any step of flowchart 800), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processor system 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

execute a first autonomous artificial intelligence (AI) agent that, in response to receiving an inquiry that asks whether an entity exhibits malicious behavior, selects relevant data from a corpus of data using a first selected AI tool as a result of the relevant data being associated with the entity, wherein the first selected AI tool is selected by the first autonomous AI agent from a plurality of first AI tools in an AI model that are available to the first autonomous AI agent;

execute a second autonomous AI agent that, in response to receiving the relevant data from the first autonomous AI agent, generates a maliciousness determination by analyzing the relevant data using a second selected AI tool, wherein the maliciousness determination indicates whether the entity exhibits the malicious behavior, and wherein the second selected AI tool is selected by the second autonomous AI agent from a plurality of second AI tools in the AI model that are available to the second autonomous AI agent;

execute a third autonomous AI agent that generates a validity determination by analyzing the maliciousness determination using a third selected AI tool, wherein the validity determination indicates whether the maliciousness determination is valid, and wherein the third selected AI tool is selected by the third autonomous AI agent from a plurality of third AI tools in the AI model that are available to the third autonomous AI agent; and as a result of an analysis that takes into consideration the validity determination, trigger execution of an instruction that causes a security action to be performed with regard to the entity.

2. The system of claim 1, wherein the computer-executable instructions are executable by the processor system to at least:

trigger the execution of the instruction that causes at least one of the following:

access of a user to the entity to be blocked, or a statement to be provided via a user interface, the statement indicating whether the entity exhibits malicious behavior.

3. The system of claim 1, wherein the first autonomous AI agent triggers the first selected AI tool to select the relevant data from the corpus of data by providing a first AI prompt, which identifies the corpus of data, as an input to the first selected AI tool, the first AI prompt requesting selection of data that is associated with the entity from the corpus of data;

wherein the second autonomous AI agent triggers the second selected AI tool to determine whether the entity exhibits the malicious behavior by providing a second AI prompt together with designated contextual information as inputs to the second selected AI tool, the second AI prompt requesting a determination whether the entity exhibits the malicious behavior, wherein the designated contextual information comprises the relevant data, and wherein the designated contextual information comprises context regarding the second AI prompt; and wherein the third autonomous AI agent triggers the third selected AI tool to determine whether the maliciousness determination is valid by providing a third AI prompt together with specified contextual information as inputs to the third selected AI tool, the third AI prompt requesting a determination whether the maliciousness determination is valid, wherein the specified contextual information comprises the relevant data and the maliciousness determination, and wherein the specified contextual information comprises context regarding the third AI prompt.

4. The system of claim 1, wherein, in response to receiving the inquiry that asks whether the entity exhibits the malicious behavior, the first autonomous AI agent identifies potentially anomalous data in at least a portion of the corpus of data using an anomaly detection tool as a result of differences between embeddings of the potentially anomalous data and a reference embedding that corresponds to at least the portion of the corpus of data being greater than differences between embeddings of other data in at least the portion of the corpus of data and the reference embedding, wherein the anomaly detection tool is selected by the first autonomous AI agent from the plurality of first AI tools in the AI model that are available to the first autonomous AI agent; and wherein the third autonomous AI agent generates the validity determination by analyzing the maliciousness determination and a description of the potentially anomalous data using the third selected AI tool.

5. The system of claim 4, wherein, in response to receiving the inquiry that asks whether the entity exhibits the malicious behavior, the first autonomous AI agent identifies the potentially anomalous data in at least the portion of the corpus of data using an isolation forest tool that performs an isolation forest anomaly detection technique on at least the portion of the corpus of data, wherein the isolation forest tool is selected by the first autonomous AI agent from the plurality of first AI tools in the AI model that are available to the first autonomous AI agent.

6. The system of claim 1, wherein, in response to receiving the inquiry that asks whether the entity exhibits the malicious behavior, the first autonomous AI agent identifies statistically anomalous data in the relevant data using an anomaly detection tool as a result of events indicated by embeddings of the statistically anomalous data occurring more than an expected number of times during a period of time, wherein the anomaly detection tool is selected by the first autonomous AI agent from the plurality of first AI tools in the AI model that are available to the first autonomous AI agent; and wherein the third autonomous AI agent generates the validity determination by analyzing the maliciousness determination and a description of the statistically anomalous data using the third selected AI tool.

7. The system of claim 6, wherein, in response to receiving the inquiry that asks whether the entity exhibits the malicious behavior, the first autonomous AI agent identifies the statistically anomalous data in the relevant data using at least one of the following:

a frequency analysis tool that performs a frequency analysis technique on the relevant data, wherein the frequency analysis tool is selected by the first autonomous AI agent from the plurality of first AI tools in the AI model that are available to the first autonomous AI agent; or a p-value analysis tool that performs a p-value analysis technique on the relevant data, wherein the p-value analysis tool is selected by the first autonomous AI agent from the plurality of first AI tools in the AI model that are available to the first autonomous AI agent.

8. The system of claim 1, wherein the validity determination indicates that the maliciousness determination is invalid;

wherein the computer-executable instructions are executable by the processor system to at least:

execute a fourth autonomous AI agent that generates an overriding validity determination by performing the analysis of the maliciousness determination and the validity determination using a fourth selected AI tool, wherein the overriding validity determination indicates whether the validity determination that is generated by the third autonomous AI agent is to be overturned, and wherein the fourth selected AI tool is selected by the fourth autonomous AI agent from a plurality of fourth AI tools in the AI model that are available to the fourth autonomous AI agent; and perform the security action using the overriding validity determination.

9. The system of claim 8, wherein the fourth autonomous AI agent triggers the fourth selected AI tool to determine whether the validity determination that is generated by the third autonomous AI agent is to be overturned by providing an AI prompt together with contextual information as inputs to the fourth selected AI tool, wherein the AI prompt requests a determination whether the validity determination that is generated by the third autonomous AI agent is to be overturned, wherein the contextual information comprises the relevant data, the maliciousness determination, and the validity determination, and wherein the contextual information comprises context regarding the AI prompt.

10. The system of claim 8, wherein the computer-executable instructions are executable by the processor system further to at least:

trigger the fourth autonomous AI agent to generate the overriding validity determination by providing an AI prompt and contextual information as inputs to the fourth autonomous AI agent, wherein the AI prompt specifies that a purpose of the fourth autonomous AI agent is to determine whether the validity determination is to be overturned, wherein the contextual information comprises the relevant data, the maliciousness determination, and the validity determination, and wherein the contextual information comprises context regarding the AI prompt.

11. The system of claim 8, wherein the fourth autonomous AI agent generates a mediation report that indicates the overriding maliciousness determination; and wherein the computer-executable instructions are executable by the processor system further to at least:

as a result of the fourth autonomous AI agent generating the mediation report, receive an assessment of the mediation report from a user, the assessment indicating a recommended change to be incorporated into the analysis performed by the fourth autonomous AI agent using the fourth selected AI tool; and train the fourth autonomous AI agent using the assessment.

12. A method implemented by a computing system, the method comprising:

in response to receiving an inquiry that asks whether an entity exhibits malicious behavior, selecting, by a first autonomous artificial intelligence (AI) agent, relevant data from a corpus of data using a first selected AI tool, which is selected by the first autonomous AI agent from a plurality of first AI tools in an AI model that are available to the first autonomous AI agent, as a result of the relevant data being associated with the entity;

in response to receiving the relevant data from the first autonomous AI agent, generating, by a second autonomous AI agent, a maliciousness determination, which indicates whether the entity exhibits the malicious behavior, by analyzing the relevant data using a second selected AI tool, which is selected by the second autonomous AI agent from a plurality of second AI tools in the AI model that are available to the second autonomous AI agent;

generating, by a third autonomous AI agent, a validity determination, which indicates whether the maliciousness determination is valid, by analyzing the maliciousness determination using a third selected AI tool, which is selected by the third autonomous AI agent from a plurality of third AI tools in the AI model that are available to the third autonomous AI agent; and as a result of an analysis that takes into consideration the validity determination, triggering execution of an instruction that causes a security action to be performed with regard to the entity.

13. The method of claim 12, wherein selecting the relevant data from the corpus of data comprises:

selecting, by the first autonomous AI agent, first relevant data from the corpus of data using a sampling tool, which is selected by the first autonomous AI agent from the plurality of first AI tools in the AI model that are available to the first autonomous AI agent, as a result of a first embedding that represents the first relevant data corresponding to a center of a plurality of embeddings that represent the corpus of data;

selecting, by the first autonomous AI agent, second relevant data from the corpus of data using the sampling tool as a result of a distance between a second embedding that represents the second relevant data and the first embedding being greater than distances between others of the plurality of embeddings and the first embedding;

selecting, by the first autonomous AI agent, third relevant data from the corpus of data using the sampling tool as a result of a first distance or a second distance, whichever is less, being greater than third distances or fourth distances, whichever are less;

wherein the first distance is between a third embedding that represents the third relevant data and the first embedding;

wherein the second distance is between the third embedding and the second embedding;

wherein the third distances are between others of the plurality of embeddings and the first embedding; and wherein the fourth distances are between the others of the plurality of embeddings and the second embedding.

14. The method of claim 13, wherein selecting the first relevant data comprises:

selecting, by the first autonomous AI agent, the first relevant data from the corpus of data using the sampling tool as a result of the embedding that represents the first relevant data corresponding to an average of the plurality of embeddings or a median of the plurality of embeddings.

15. The method of claim 12, wherein selecting the relevant data from the corpus of data comprises:

clustering, by the first autonomous AI agent, subsets of the corpus of data into respective clusters using a clustering tool, which is selected by the first autonomous AI agent from the plurality of first AI tools in the AI model that are available to the first autonomous AI agent, by analyzing a plurality of embeddings that represent the corpus of data using the clustering tool as a result of the subsets corresponding to respective attributes; and selecting, by the first autonomous AI agent, the relevant data from the respective clusters using the first selected AI tool.

16. The method of claim 12, wherein the method further comprises:

training the second selected AI tool using the validity determination.

17. The method of claim 12, further comprising at least one of the following:

triggering the first autonomous AI agent to select the relevant data from the corpus of data by providing a first AI prompt, which identifies the corpus of data, as an input to the first autonomous AI agent, the first AI prompt specifying that a purpose of the first autonomous AI agent is to select the relevant data from the corpus of data;

triggering the second autonomous AI agent to generate the maliciousness determination by providing a second AI prompt together with designated contextual information as inputs to the second autonomous AI agent, wherein the second AI prompt specifies that a purpose of the second autonomous AI agent is to determine whether the entity exhibits the malicious behavior, wherein the designated contextual information comprises the relevant data, and wherein the designated contextual information comprises context regarding the second AI prompt; or triggering the third autonomous AI agent to generate the validity determination by providing a third AI prompt together with specified contextual information as inputs to the third autonomous AI agent, wherein the third AI prompt specifies that a purpose of the third autonomous AI agent is to determine whether the maliciousness determination is valid, wherein the specified contextual information comprises the relevant data and the maliciousness determination, and wherein the specified contextual information comprises context regarding the third AI prompt.

18. The method of claim 12, further comprising:

generating, by the first autonomous AI agent, a data report that indicates the relevant data;

as a result of the first autonomous AI agent generating the data report, receiving an assessment of the data report from a user, the assessment indicating a change to be made to the relevant data; and training the first autonomous AI agent using the assessment.

19. The method of claim 12, further comprising:

generating, by the second autonomous AI agent, a maliciousness report that indicates the maliciousness determination;

as a result of the second autonomous AI agent generating the maliciousness report, receiving an assessment of the maliciousness report from a user, the assessment indicating a revised maliciousness determination, which differs from the maliciousness determination indicated by the maliciousness report, the revised maliciousness determination indicating whether the entity exhibits the malicious behavior; and training the second autonomous AI agent using the assessment.

20. The method of claim 12, further comprising:

generating, by the third autonomous AI agent, a validity report that indicates the validity determination;

as a result of the third autonomous AI agent generating the validity report, receiving an assessment of the validity report from a user, the assessment indicating a revised validity determination, which differs from the validity determination indicated by the validity report, the revised validity determination indicating whether the maliciousness determination is valid; and training the third autonomous AI agent using the assessment.

21. A computer program product comprising a computer-readable storage medium having instructions recorded thereon for enabling a processor-based system to perform operations, the operations comprising:

executing a first autonomous artificial intelligence (AI) agent that, in response to receiving an inquiry that asks whether an entity exhibits malicious behavior, selects relevant logs from a plurality of logs using a first selected AI tool as a result of the relevant logs being associated with the entity, wherein the first selected AI tool is selected by the first autonomous AI agent from a plurality of first AI tools in an AI model that are available to the first autonomous AI agent;

executing a second autonomous AI agent that, in response to receiving the relevant logs from the first autonomous AI agent, generates a maliciousness determination by analyzing the relevant logs using a second selected AI tool, wherein the maliciousness determination indicates whether the entity exhibits the malicious behavior, and wherein the second selected AI tool is selected by the second autonomous AI agent from a plurality of second AI tools in the AI model that are available to the second autonomous AI agent;

executing a third autonomous AI agent that generates a validity determination by analyzing the maliciousness determination using a third selected AI tool, wherein the validity determination indicates whether the maliciousness determination is valid, and wherein the third selected AI tool is selected by the third autonomous AI agent from a plurality of third AI tools in the AI model that are available to the third autonomous AI agent; and as a result of an analysis that takes into consideration the validity determination, triggering execution of an instruction that causes a statement to be provided via a user interface, the statement indicating whether the entity exhibits malicious behavior.

* * * * *